US008947589B1

(12) United States Patent
Okabe et al.

(10) Patent No.: US 8,947,589 B1
(45) Date of Patent: Feb. 3, 2015

(54) IMAGING DEVICE

(71) Applicant: Sony Corporation, Minato-ku (JP)

(72) Inventors: Yasuhiro Okabe, Kanagawa (JP);
Osamu Mizukami, Kanagawa (JP);
Yuuji Sasaki, Tokyo (JP); Osamu Toyoshima, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/182,841

(22) Filed: Feb. 18, 2014

(30) Foreign Application Priority Data

| Aug. 19, 2013 | (JP) | 2013-169727 |
| Aug. 23, 2013 | (JP) | 2013-173891 |
| Sep. 17, 2013 | (JP) | 2013-192269 |
| Jan. 24, 2014 | (JP) | 2014-011231 |

(51) Int. Cl.
*H04N 5/225* (2006.01)
*H04N 1/00* (2006.01)

(52) U.S. Cl.
CPC .......... *H04N 5/2251* (2013.01); *H04N 1/00129* (2013.01)
USPC ........................................... 348/373

(58) Field of Classification Search
USPC .......... 348/372–376; 396/422, 529–530, 539; 455/572–573, 575.1
See application file for complete search history.

(56) References Cited

U.S. PATENT DOCUMENTS

| 6,101,339 | A * | 8/2000 | Miki et al. | 396/301 |
| 6,731,952 | B2 * | 5/2004 | Schaeffer et al. | 455/557 |
| 7,604,423 | B2 * | 10/2009 | Nagata et al. | 396/529 |
| 7,649,550 | B2 * | 1/2010 | Ishiyama et al. | 348/211.14 |
| 7,726,890 | B2 * | 6/2010 | Misawa | 396/529 |
| 2002/0013161 | A1 * | 1/2002 | Schaeffer et al. | 455/557 |
| 2006/0038917 | A1 * | 2/2006 | Funato et al. | 348/376 |

FOREIGN PATENT DOCUMENTS

| CN | 101322640 A | 12/2008 |
| CN | 102867473 A | 1/2013 |
| JP | 61-59974 | 3/1986 |
| JP | 11-298770 | 10/1999 |
| JP | 2000-224449 | 8/2000 |
| JP | 2003-156790 | 5/2003 |
| JP | 2003-319232 | 11/2003 |
| JP | 2006-041952 | 2/2006 |

(Continued)

OTHER PUBLICATIONS

Office Action issued Mar. 18, 2014 in Japanese Patent Application No. 2014-011229 (with English-language Translation).

(Continued)

*Primary Examiner* — Aung S Moe
*Assistant Examiner* — Amy Hsu
(74) *Attorney, Agent, or Firm* — Oblon, Spivak, McClelland, Maier & Neustadt, L.L.P.

(57) ABSTRACT

An imaging device includes a communication part that transmits an image data to an external display device, an outer barrel, an imaging element, and first and second coupling parts that are configured to be coupled to an installation device which is attachable to and detachable from the display device. The first and second coupling parts are disposed at a rear surface part of the outer barrel, and a storage part that stores a battery is provided between the first coupling part and the second coupling part in the rear surface part of the outer barrel.

23 Claims, 35 Drawing Sheets

(56) References Cited

FOREIGN PATENT DOCUMENTS

| | | |
|---|---|---|
| JP | 2006-78738 | 3/2006 |
| JP | 2006-128933 | 5/2006 |
| JP | 2006-237774 | 9/2006 |
| JP | 2006-295838 | 10/2006 |
| JP | 2007-78827 | 3/2007 |
| JP | 2007-110314 | 4/2007 |
| JP | 2007-279486 | 10/2007 |
| JP | 2007-312297 | 11/2007 |
| JP | 2008-193457 | 8/2008 |
| JP | 2008-271151 | 11/2008 |
| JP | 2009-207069 | 9/2009 |
| JP | 2010-45689 | 2/2010 |
| JP | 2010-160286 | 7/2010 |
| JP | 2010-171607 | 8/2010 |
| JP | 2011-182449 | 9/2011 |
| JP | 2011-259065 | 12/2011 |
| JP | 2013-157737 | 8/2013 |
| JP | 2013-257518 | 12/2013 |
| JP | 2014-011229 | 1/2014 |

OTHER PUBLICATIONS

Office Action issued Mar. 18, 2014 in Japanese Patent Application No. 2014-011230 (with English-language Translation).
Office Action issued Mar. 18, 2014 in Japanese Patent Application No. 2014-011231 (with English-language Translation).
International Search Report mailed Nov. 11, 2014 in PCT/JP2014/070889 filed Aug. 7, 2014 (with English-language Translation).
Combined Chinese Office Action and Search Report issued Oct. 10, 2014, in Chinese Patent Application No. 201410218796.8 with English translation.

* cited by examiner

IMAGING DEVICE

CROSS REFERENCE TO RELATED APPLICATIONS

This application claims the benefit of Japanese Priority Patent Application JP 2013-169727 filed Aug. 19, 2013, Japanese Priority Patent Application JP 2013-173891 filed Aug. 23, 2013, Japanese Priority Patent Application JP 2013-192269 filed Sep. 17, 2013, and Japanese Priority Patent Application JP 2014-011231 filed Jan. 24, 2014, the entire contents of each of which are incorporated herein by reference.

BACKGROUND

The present technology relates to an imaging device which can perform an imaging operation in cooperation with a display device.

There is an apparatus in which one device of devices having different functions is attachable to and detachable from the other device. As such an apparatus in which one device is attachable to and detachable from the other device, for example, there is an apparatus including an interchangeable lens having a zoom function and a camera device main body having an imaging function.

In addition, there is an apparatus in which one device of devices having different functions is attachable to and detachable from the other device via an adaptor, and, as an example thereof, there is an apparatus in which an interchangeable lens is attachable to and detachable from a camera device main body via an adaptor (for example, refer to Japanese Unexamined Patent Application Publication No. 2013-92556).

Japanese Unexamined Patent Application Publication No. 2013-92556 discloses a method in which the entire adaptor is rotated about the camera device main body, and an engagement part is engaged with an engagement part of the camera device main body, as a method of attaching the adaptor to the camera device main body.

Meanwhile, in recent years, along with advance of communication technique such as a wireless local area network (LAN), for example, a technique has been developed in which an image data acquired by an imaging device is displayed on a display portion (a display) of a display device.

In such a case where communication is performed between the display device and the imaging device by using the wireless communication technique, it is not necessary to provide a structure for electrical connection between the adaptor and the imaging device, and thus an attachment mechanism (attachment and detachment mechanism) of the adaptor to the display device may be a simple mechanism.

SUMMARY

Meanwhile, it is necessary for the imaging device which can perform an imaging operation in cooperation with the display device to have a device configuration suitable for a cooperative action or attachment and detachment.

Therefore, it is desirable to provide a device configuration suitable for a cooperative action or attachment and detachment.

According to an embodiment of the present technology, there is provided an imaging device including a communication part that transmits an image data to an external display device; an outer barrel; an imaging element; and first and second coupling parts that are configured to be coupled to an installation device which is attachable to and detachable from the display device, in which the first and second coupling parts are disposed at a rear surface part of the outer barrel, and in which a storage part that stores a battery is provided between the first coupling part and the second coupling part in the rear surface part of the outer barrel. A device which performs an imaging operation and/or a display operation in cooperation with an external display device is implemented using the imaging device having the communication part, the outer barrel, and the imaging element. In this case, the battery storage part is provided by effectively using the rear surface part in which the first and second coupling parts are provided, that is, the space of the installation surface side with the installation device. Particularly, since the storage part is provided between the first and second coupling parts, the storage part can be provided in a state in which installation of an installation device is not impeded.

In addition, preferably, the storage part allows a battery to be stored from a direction which is substantially perpendicular to an imaging optical axis. If a battery is stored in a vertical posture, this does not influence the shape of the outer barrel, and thus a degree of freedom of design of the imaging device increases.

Preferably, the storage part is provided with a battery lid that closes the storage part storing a battery. The battery lid is provided, and thus the rear surface part looks good. In addition, it is possible to prevent a battery from falling.

Preferably, the storage part is provided with a battery lid that closes the storage part storing a battery, and the battery lid is slid downward. It is possible to easily open the battery lid due to the downward sliding. In addition, due to the downward sliding, the shape of the battery lid is not exposed to the upper side of the outer barrel, and thus the external appearance looks good.

Preferably, the first and second coupling parts are set to fixed positions so as not to be slid in the rear surface part. The first and second coupling parts have a structure of not being slid even if the battery lid is slid. Accordingly, the sliding of the battery lid does not impede the function of the coupling parts.

In addition, preferably, the storage part is provided with a battery lid that closes the storage part storing a battery, and the battery lid is slid to avoid the first and second coupling parts. The battery lid has a structure of being slid to avoid the first and second coupling parts, and thus the sliding of the battery lid does not impede the function of the coupling parts.

Preferably, the first and second coupling parts are set to fixed positions so as not to be slid in the rear surface part.

In addition, preferably, the storage part is provided with a battery lid that closes the storage part storing a battery, the battery lid includes a connection member to the rear surface part of the outer barrel, the connection member connects an upper side of the battery lid to the rear surface part, and the battery lid can be opened upward with the connection member as a fulcrum. The battery lid is prevented from falling off by the connection member.

Preferably, the storage part has a connection terminal to a battery, which is provided at an upper side in a battery storage space.

Preferably, the storage part is formed so that a battery is horizontally symmetrically stored.

In addition, preferably, the first and second coupling parts protrude backward from the rear surface part of the outer barrel. Accordingly, a shape for engagement is realized.

Preferably, the first and second coupling parts are disposed at an outer circumference of the rear surface part of the outer barrel. The first and second coupling parts are disposed at the outer circumference, and thus a battery storage space is not impeded.

Preferably, the first and second coupling parts include locking protrusions that protrude outward separately from each other in a circumferential direction. A state of being engaged with an installation device is formed by the locking protrusions.

Preferably, a lock pin that maintains a coupling state is formed around the first and second coupling parts. A movement in an unlocked direction and a rotatable movement are restricted by the lock pin, and thus a coupling state is maintained.

In addition, preferably, an imaging device main body and the installation device are relatively rotated via the first and second coupling parts so as to couple the imaging device main body and the installation device to each other. Accordingly, coupling between the imaging device and the installation device can be easily performed.

Further, preferably, the imaging device includes an image taking button, a power button, and a zoom switch; a circumferential surface part is provided at the outer barrel; the image taking button is disposed at a left side of the circumferential surface part; the power button is disposed at an upper side of the circumferential surface part; and the zoom switch is disposed at the circumferential surface part. By using the imaging device including the communication part, the outer barrel, the imaging element, the image taking button, the power button, and the zoom switch, it is possible to implement a device suitable for performing an imaging operation and/or a display operation in cooperation with an external display device.

Furthermore, preferably, the imaging device includes an image taking button, a power button, a zoom switch, and a rolling prevention part that prevents a device casing from rolling in a placed state; a circumferential surface part which at least partially has a curved surface is provided at the outer barrel; the image taking button is disposed at the circumferential surface part; the power button is disposed at the circumferential surface part; the zoom switch is disposed at the circumferential surface part; and the rolling prevention part is disposed at a lower side of the circumferential surface part. The shape of the circumferential surface part having the curved surface is effective to rolling prevention.

In addition, preferably, the imaging device includes an image taking button, and a power button; a circumferential surface part is provided at the outer barrel; and the image taking button and the power button are disposed at different positions in a circumferential direction on the circumferential surface part. By using the imaging device including the communication part, the outer barrel, the imaging element, the image taking button, and the power button, it is possible to implement a device suitable for performing an imaging operation and/or a display operation in cooperation with an external display device.

Preferably, the imaging device further includes a power button, and the power button is disposed so as not to further protrude than a surface forming the circumferential surface part of the outer barrel. The power button does not protrude, which is thus suitable for preventing the power button from being erroneously operated.

Preferably, the imaging device further includes a microphone that inputs an external sound and is disposed at the circumferential surface part of the outer barrel. In such a device in which the outer barrel as a lens casing is a main body, the circumferential surface part of the outer barrel is most unlikely to block external sounds, and thus the microphones are disposed at the circumferential surface part, which is thus suitable for collecting external sounds.

Preferably, a tripod hole is disposed at a lower end of the circumferential surface part of the outer barrel. In a case where the outer barrel has a formation that outlines the main body of the imaging device, a tripod hole is formed at the lower end of the circumferential surface part, and thus balance can be kept well during attachment of a tripod.

Preferably, the imaging device further includes a near field communication part that is disposed at positions other than a rear surface side of the outer barrel. This is because, if the NEC part which performs near field communication is disposed at the rear surface side, when the imaging device is attached to the display device, polling may occur at all times.

Preferably, the imaging device further includes a near field communication part that is disposed at an upper side of the circumferential surface part of the outer barrel. Accordingly, if an external device becomes naturally close to the imaging device in a state of being placed on a desk or the like, wireless communication can be performed.

According to the present technology, it is possible to realize a device configuration suitable for a cooperative action, an operation, or attachment and detachment in relation to an imaging device which can perform an imaging operation in cooperation with an external display device.

In addition, the effects described in the present specification are only an example and are not limited, and other effects may be achieved.

DETAILED DESCRIPTION OF EMBODIMENTS

Here, embodiments of the present technology will be described with reference to the accompanying drawings.

In the following description, directions viewed from a photographer in an image taking operation using an imaging device are set to a front and rear direction, a vertical direction, and a horizontal direction. Therefore, a subject side is a front side, and the photographer side is a rear side.

In addition, the front and rear direction, the vertical direction, and the horizontal direction described below are for convenience of description, and carrying out the present technology is not limited to these directions.

Schematic Configuration of Imaging Unit

Figure 1:
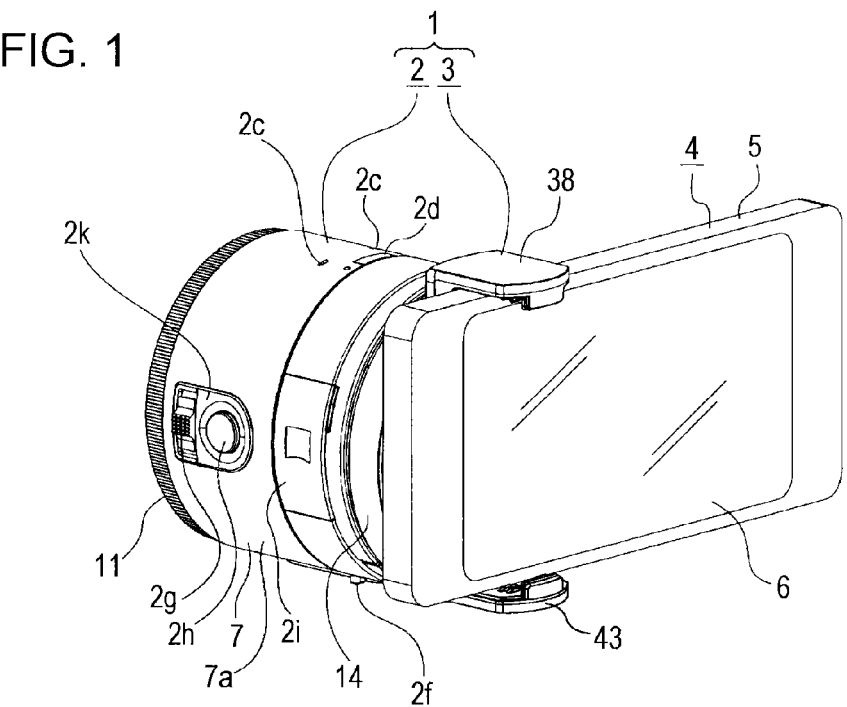
FIG. 1 illustrates an adaptor and an imaging unit according to an embodiment of the present technology along with FIGS. 2 to 40, and is a perspective view of an imaging unit and a display device.
Figure 2:
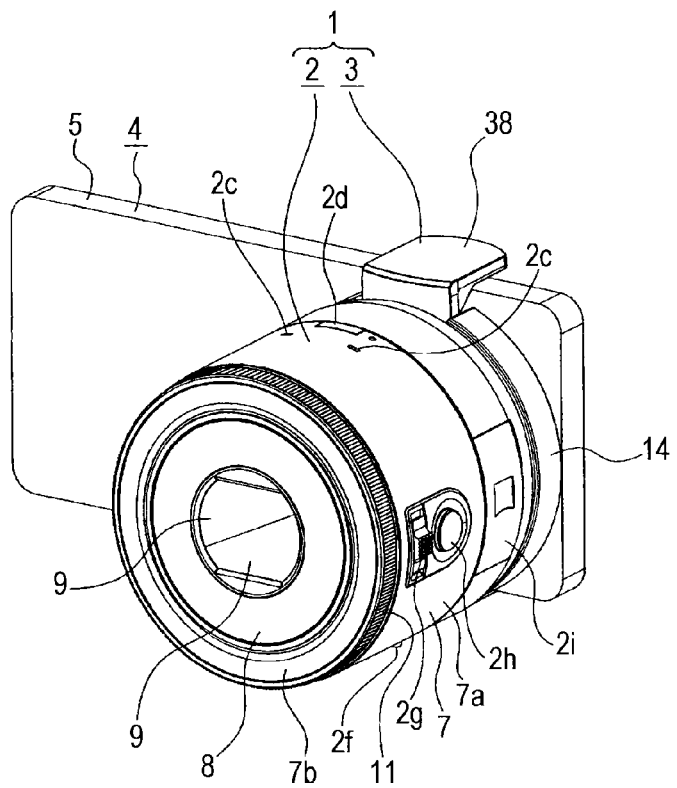
FIG. 2 is a perspective view illustrating a state in which the imaging unit and the display device are viewed from a direction different from FIG. 1.
Figure 3:
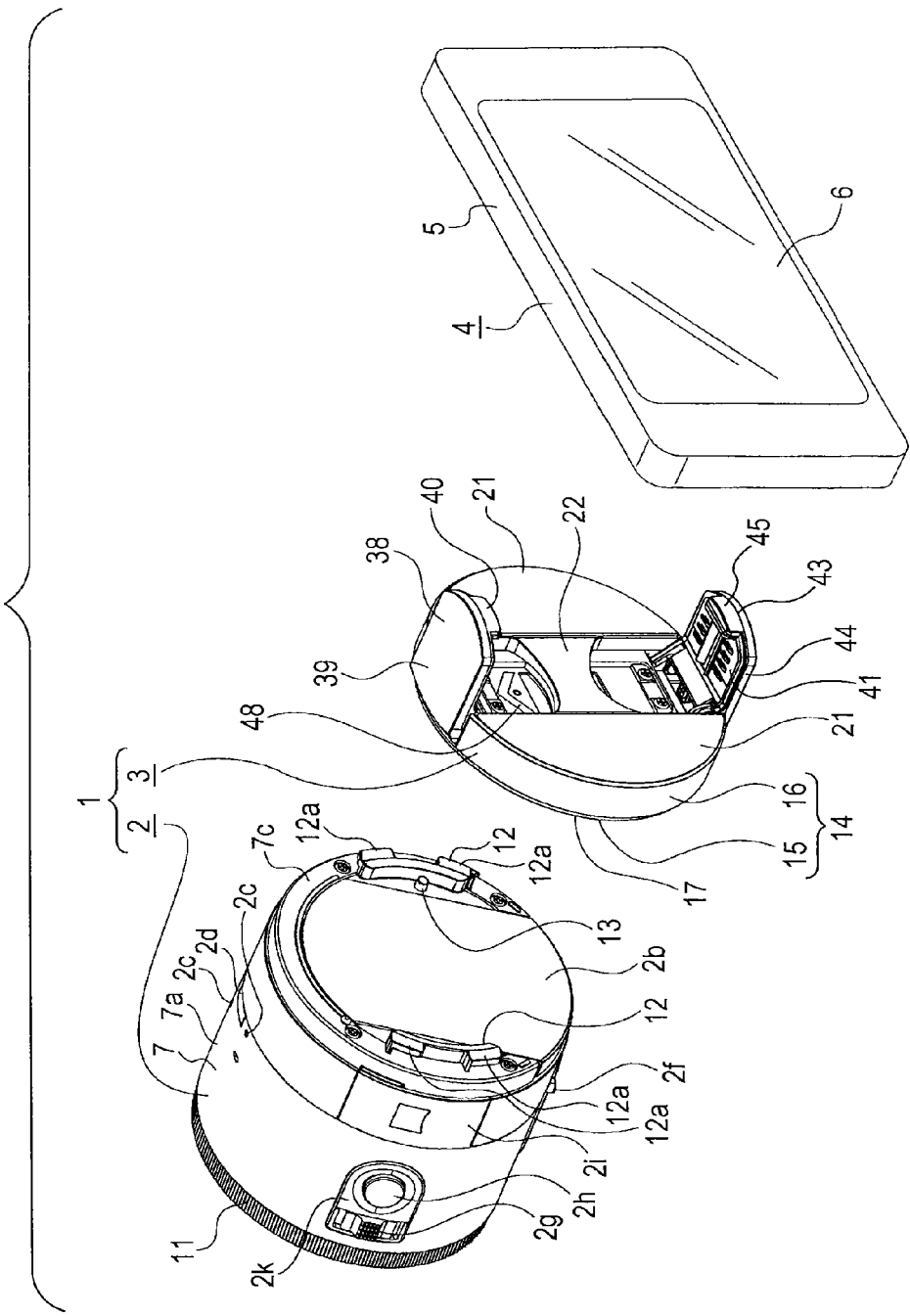
FIG. 3 is an exploded view illustrating an imaging device and the display device.

An imaging unit 1 includes an imaging device 2 and an adaptor 3 (an installation portion or an installation device) (refer to FIGS. 1 to 3). The adaptor 3 is attachable to and detachable from a rear surface of the imaging device 2. However, the imaging unit 1 may have an integrated configuration in which the adaptor 3 is integrally formed with the imaging device 2 at a rear end of the imaging device. The imaging device 2 has a communication function of transmitting and receiving an image data or the like to and from a display device 4.

The adaptor 3 is attachable to and detachable from the display device 4. The display device 4 is, for example, a mobile phone. However, the display device 4 is not limited to a mobile phone, and may be other devices having a display function, for example, a portable terminal, a television system, and the like.

In addition, hereinafter, a description will be made of a case where the imaging device 2 is configured separately from the adaptor 3, and the adaptor 3 coupled to the imaging device 2 is attachable to and detachable from the display device 4 which is a mobile phone.

Schematic Configuration of Display Device

The display device 4 includes respective necessary parts disposed inside and outside an outer casing 5. The outer casing 5 is formed, for example, in a substantially rectangular case shape, and a display panel 6 is provided on one surface (rear surface). The display panel 6 is a touch panel, and a predetermined function is executed by performing a contact operation on each predetermined position of the display panel 6.

The display device 4 has a communication function of transmitting and receiving an image data or the like to and from the imaging device 2.

Configuration of Imaging Device

The imaging device 2 includes an outer barrel 7, a plurality of lens groups disposed inside the outer barrel 7, and an imaging element (not illustrated) located on the rear side of the lens groups (refer to FIGS. 1 to 10). In the imaging device 2, light incorporated via the lens groups is subject to photoelectric conversion in the imaging element. Therefore, the imaging device 2 can capture an image data or a video data.

The outer barrel 7 includes a circumferential surface part 7a which is formed in a substantially cylindrical shape extending from the front side to the rear side, an overhang part 7b which overhangs inward from a front end of the circumferential surface part 7a, and a rear surface part 7c which closes the circumferential surface part 7a from the rear side.

Figure 4:
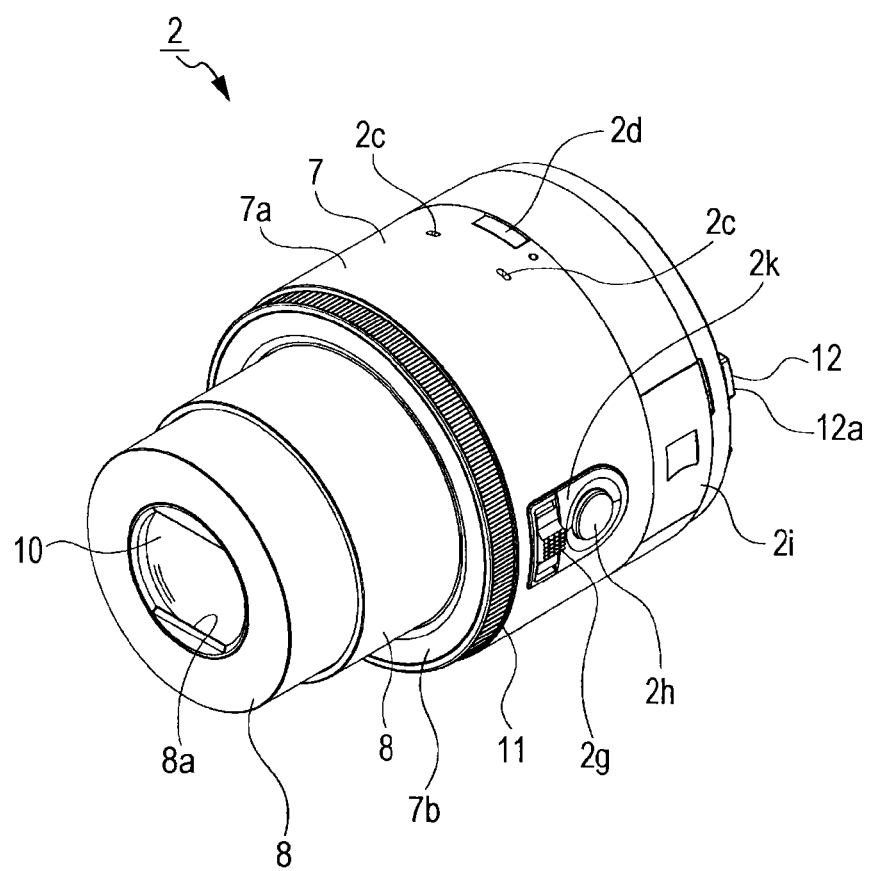
FIG. 4 is a perspective view of the imaging device used in an image taking operation.
Figure 5:
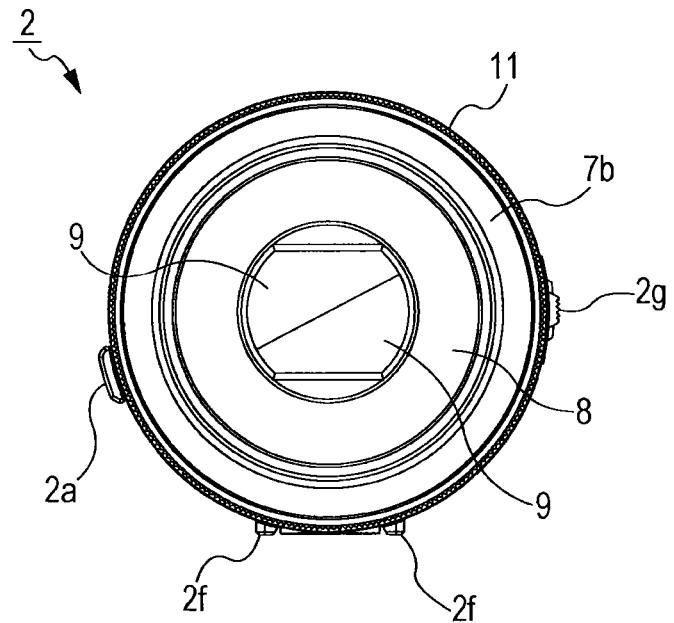
FIG. 5 is an enlarged front view of the imaging device.

Inner barrels 8 and 8 which can be moved in the front and rear direction are supported inside the outer barrel 7 (refer to FIGS. 3 to 5). Therefore, the imaging device 2 is turned to an image taking state (refer to FIG. 4) when the inner barrels 8 and 8 protrude forward with respect to the outer barrel 7, and is turned to a collapsed state (refer to FIG. 2) when the inner barrels 8 and 8 which have protruded forward are withdrawn backward and are stored in the outer barrel 7.

A light passing hole 8a with a substantially rectangular shape is formed in a front surface part of the inner barrel 8 which is located on the innermost side (refer to FIG. 4). Lens barriers 9 and 9 are supported on a rear surface side of the front surface part of the inner barrel 8 which is located on the innermost side, so as to be freely opened and closed. The lens barriers 9 and 9 are closed in a collapsed state and are opened in an image taking state by an opening and closing mechanism (not illustrated). Therefore, in the collapsed state, the light passing hole 8a of the inner barrel 8 is closed by the lens barriers 9 and 9 (refer to FIG. 2), and, in the image taking state, the light passing hole 8a is opened by the lens barriers 9 and 9 (refer to FIG. 4).

A plurality of lens groups including an image taking lens 10 (refer to FIG. 4) located on the frontmost side are disposed separately from each other in the optical axis direction inside the imaging device 2, and if the light passing hole 8a is opened by the lens barriers 9 and 9, light is incident to the image taking lens 10 from outside.

An operation ring 11 is rotatably supported at the front end of the outer barrel 7 (refer to FIG. 2). When the operation ring 11 is operated, the lens groups which perform manual focusing or zooming are moved in the optical axis direction.

The operation ring 11 is provided in a circular shape at the front end of the outer barrel 7, and thus a user easily performs a rotation operation of the operation ring 11. If the surface of the operation ring 11 is formed by a sawtooth-shaped grip part, this is also suitable for operability improvement of a rotation operation.

In addition, the operation ring 11 can change operation content between a manual focusing operation and a zooming operation on the basis of control using wireless communication described later in response to a user's operation from the display device 4. Therefore, the operation ring 11 may be used as an operation part of a focusing operation and a zooming operation in accordance with a user's taste or circumstances.

Figure 6:
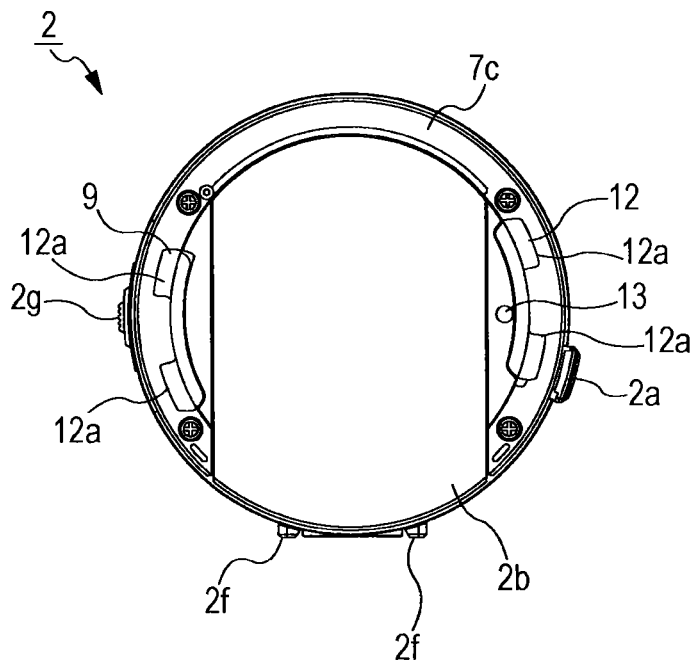
FIG. 6 is an enlarged rear view of the imaging device.

First and second coupling parts 12 and 12 which protrude backward are provided at positions opposite to each other, 180° apart on an outer circumference of the rear surface part 7c of the outer barrel 7 (refer to FIGS. 3 and 6). Locking protrusions 12a and 12a which protrude outward separately in a circumferential direction are respectively provided at the coupling parts 12 and 12. Accordingly, an engagement structure body is formed which is engaged with coupling recess parts 18a and 18a and locking pieces 17a and 17a of the adaptor 3, described later.

A lock pin 13 is supported movably in the front and rear direction around the coupling part 12 of the rear surface part 7c, and the lock pin 13 is biased backward by a spring (not illustrated).

Figure 10:
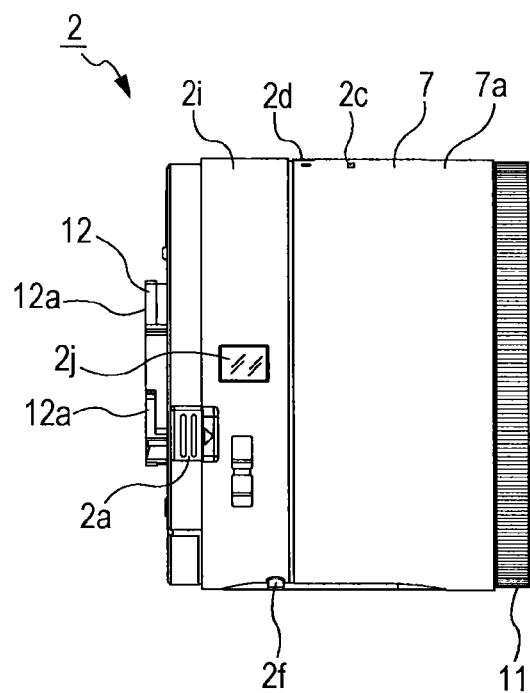
FIG. 10 is an enlarged right side view of the imaging device.

An unlock lever 2a is disposed at the rear end of the circumferential surface part 7a of the outer barrel 7 (refer to FIG. 10). The unlock lever 2a is operated, and thus the lock pin 13 is drawn into the outer barrel 7.

A battery lid 2b is disposed at a portion between the coupling parts 12 and 12 of the rear surface part 7c of the outer barrel 7 (refer to FIGS. 3 and 6). A battery mounting part 70 (refer to FIGS. 41 and 42) is formed inside the battery lid 2b in the imaging device 2. The battery lid 2b is opened and closed, and thus a battery (not illustrated) can be installed in and removed from the storage part.

Here, first and second coupling parts 12 and 12 are formed on the outer circumference in the rear surface part 7c, and thus a space between the first and second coupling parts 12 and 12 can be used to dispose the battery lid 2b and the battery mounting part 70 therein. In other words, coupling parts 12 and 12 is formed on the outer circumference in the rear surface part 7c, and thus do not impede securing of a battery storage space.

Figure 7:
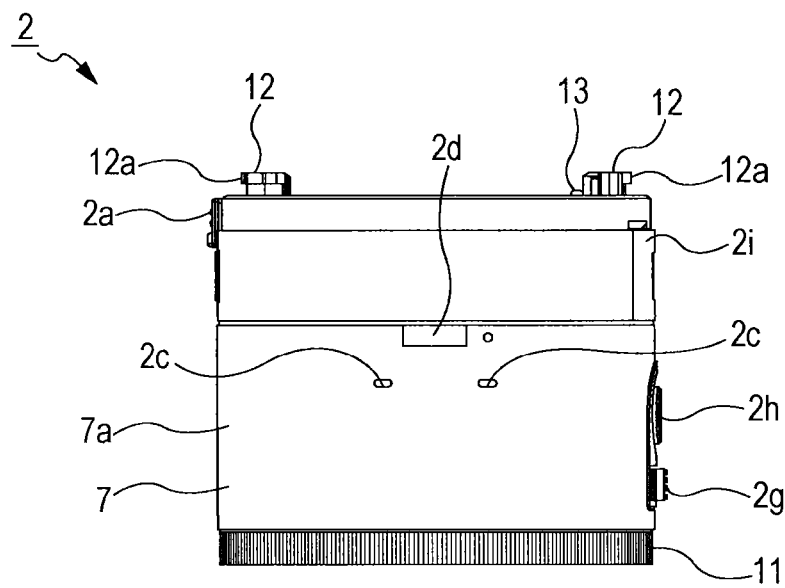
FIG. 7 is an enlarged plan view of the imaging device.

Microphones 2c and 2c and a power button 2d are disposed separately from each other in the front and rear direction at the upper end of the circumferential surface part 7a of the outer barrel 7 (refer to FIGS. 2, 3 and 7). The microphones 2c and 2c are parts for inputting external sounds. In the embodiment in which the outer barrel 7 as a lens casing is a main body, the circumferential surface part 7a of the outer barrel 7 is most unlikely to block external sounds among positions where the microphones are easily disposed. For this reason, the microphones 2c and 2c are disposed at the circumferential surface part 7a, which is thus suitable for collecting external sounds. Since the microphones 2c and 2c are provided at the upper end of the circumferential surface part 7a, the microphones 2c and 2c are hardly blocked when a user grasps the outer barrel 7, and thus are suitable to input external sounds.

In addition, the illustrated microphones 2c and 2c parts are visually recognized as microphone holes from the outside. The microphones 2c and 2c are disposed inside the circumferential surface part 7a, but at least the microphone holes (2c and 2c) which guide external sounds to the two microphones to which the external sounds are input are formed at positions which are horizontally symmetrical to each other on the circumferential surface part 7a. The horizontally symmetrical positions are suitable for collecting right and left stereo sounds.

The power button 2d is disposed so that a surface thereof does not further protrude than the surface forming the circumferential surface part 7a. For example, as illustrated in the figures, the power button is formed so as to be coplanar with the circumferential surface part 7a. Alternatively, the surface of the power button 2d may be further depressed than the circumferential surface part 7a.

The power button 2d does not further protrude than the circumferential surface part 7a, which is thus suitable for preventing the power button 2d from being erroneously operated.

If the power button 2d is operated, power is supplied or stops being supplied in the imaging device 2. When power is supplied, the inner barrels 8 and 8 protrude forward with respect to the outer barrel 7, thereby setting an image taking state, and when power stops being supplied, the inner barrels 8 and 8 which have protruded forward are withdrawn backward and are stored in the outer barrel 7, thereby setting a collapsed state.

Figure 8:
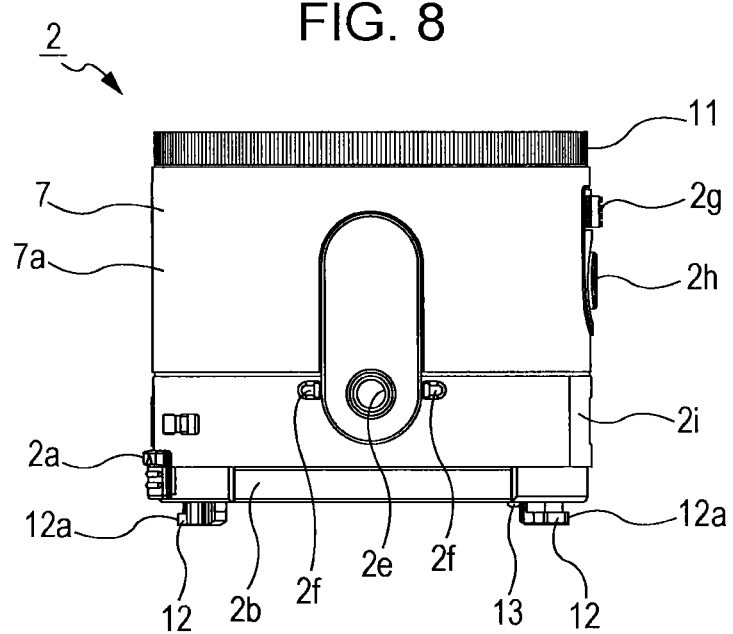
FIG. 8 is an enlarged bottom view of the imaging device.

A tripod hole 2e is formed at the lower end of the circumferential surface part 7a of the outer barrel 7 (refer to FIG. 8). The tripod hole 2e is a hole for coupling the imaging device 2 to a tripod (not illustrated) when an image taking operation is performed. In a case where the outer barrel 7 has a formation that outlines the main body of the imaging device 2 as in the present embodiment, a tripod hole 2e is formed at the lower end of the circumferential surface part 7a, and thus balance can be kept well during attachment of a tripod.

Rolling prevention protrusions 2f and 2f are provided on right and left sides of the tripod hole 2e at the lower end of the circumferential surface part 7a of the outer barrel 7 (refer to FIGS. 3 and 8). The rolling prevention protrusions 2f and 2f protrude slightly downward. The imaging device 2 is prevented from rolling by the rolling prevention protrusions 2f and 2f when the imaging device 2 is placed on a desk or a table, and thus it is possible to prevent damage or a failure by the imaging device 2 falling off desk or table or the like.

In a case where the whole or at least a part of the circumferential surface part 7a is curved, and the circumferential surface part 7a forms an outer casing, a rolling prevention protrusion 2f is useful.

Figure 9:
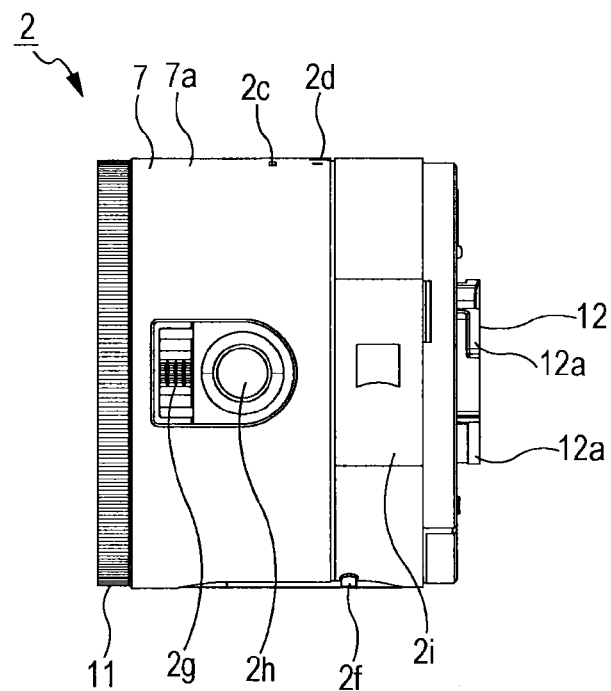
FIG. 9 is an enlarged left side view of the imaging device.

A zoom switch 2g and a shutter button (image taking button) 2h are arranged in the front and rear direction at the lower end of the circumferential surface part 7a of the outer barrel 7 (refer to FIGS. 3 and 9). If the zoom switch 2g is operated, zooming is performed between telephoto and a wide angle. If the shutter button 2h is operated, a subject is photographed. The zoom switch 2g and the shutter button 2h are disposed so as to be close to each other, and thus it is easy for a user to perform a series of image taking operations in which an angle of view is adjusted through zooming and then a shutter operation is performed. In addition, the zoom switch 2g and the shutter button 2h are not only arranged in the front and rear direction, but may also be disposed at a state of being arranged in the vertical direction or a tilt direction.

The shutter button 2h and the zoom switch 2g are disposed at the same member 2k. This member 2k forms a portion of the circumferential surface part 7a along with the outer barrel 7. The zoom switch 2g and the shutter button 2h which are disposed so as to be close to each other are attached to the member 2k, and the member 2k is attached to the outer barrel 7, thereby efficiently assembling the imaging device in terms of manufacturing.

In addition, the shutter button 2h may be, for example, an operation part for automatic focusing in a half depressing operation, and for image taking a subject in a full depressing operation. For example, assuming that the imaging device 2 is used singly, there is no display portion (that is, the display device 4), and thus a focusing operation is difficult. If automatic focusing is performed by half depressing of the shutter button 2h, it is possible to provide an operation which is intuitively easily understandable to a user. In addition, if a sound output part is provided so as to output an electronic sound during the automatic focusing operation, this is suitable for a user to recognize the operation.

Further, the zoom switch 2g is configured in a zoom lever form as illustrated in the figures. A zooming operation is performed by operating the lever, and thus operability is improved. Furthermore, the zoom switch 2g may be in a press button form using a wide angle button/telephoto button. Moreover, two zoom switches in a button form and a lever form may be provided.

Since the zoom switch 2g and the shutter button 2h are disposed at the left end of the circumferential surface part 7a, an operating finger is naturally disposed around the zoom switch 2g and the shutter button 2h when the imaging device 2 is grasped from the lower side during an image taking operation, and thus it is possible to improve the convenience for a user in using the imaging device 2 through the improvement of operability.

In addition, the zoom switch 2g and the shutter button 2h are disposed at the left end of the circumferential surface part 7a, and are thus located so as to be separated from the microphones 2c and 2c provided at the upper end of the circumferential surface part 7a. Accordingly, sounds emitted when a user operates the shutter button 2h or the zoom switch 2g are not picked up as much as possible by the microphones 2c and 2c.

In relation to the zooming operation, the zoom switch 2g and the above-described operation ring 11 are prepared. Accordingly, a user can select a zooming operation method in accordance with circumstances or a preference, and thus the operability is improved.

In addition, since the shutter button 2h and the power button 2d are disposed separately from each other at the upper side and the lateral side as different positions in the circumferential direction on the circumferential surface part 7a, it becomes easier to prevent operation errors in a power operation and an image taking operation. Further, the shutter button 2h and the power button 2d may be separated by being disposed at the right and left sides of the circumferential surface part 7a, but if it is considered to be appropriate that the power button 2d is disposed at the upper side of the circumferential surface part 7a as described above, the shutter button 2h is appropriately disposed the lateral side (the right or left side) of the circumferential surface part.

A cover body 2i is disposed at the rear side of the shutter button 2h at the left end of the circumferential surface part 7a of the outer barrel 7. In the imaging device 2, an external connection terminal such as a universal serial bus (USB) and a memory slot card (not illustrated) are provided inside the cover body 2i. Therefore, the cover body 2i is opened, and thus connection to an external device and installation of a memory card can be performed. In addition, through the connection to an external device or the installation of a memory card, an image data or a video data captured by the imaging device 2 can be recorded in the external device or the memory card.

A display part 2j formed by a liquid crystal panel or the like is disposed at the right end of the circumferential surface part 7a of the outer barrel 7 (refer to FIG. 10). The display part 2j displays a residual quantity of a battery or whether or not a memory card is inserted into the memory card slot. The display part 2j is not used to display a captured image data.

Since the display part 2j is disposed, it is possible to check a residual quantity of a battery or whether or not a memory card is inserted into the memory card slot, from the outside of the imaging device 2, and to thus improve the convenience for a user in using the imaging device 2.

The imaging device 2 has a wireless communication function. By using the wireless communication, for example, it is possible to perform various operations such as displaying or preserving an image data or a video data captured by the imaging device 2 on the display device 4, executing an image taking function of the imaging device 2 by operating the display device 4, and executing the zooming function of the imaging device 2 by operating the display device 4.

For example, specifically, an NFC part (NFC tag) which performs near field communication (NFC) is mounted in the inside close to the upper end of the circumferential surface part 7a in the outer barrel 7, and performs noncontact communication with an NFC part mounted in the display device 4. In addition, for example, wireless fidelity (WIFI) communication part is provided so as to transmit a captured image data, and performs wireless communication with a WIFI communication part mounted in the display device 4.

The imaging device 2 may not only be powered on by operating the power button 2d as described above, but also be powered on through the near field communication on the display device 4 side. For example, if the near field communication is established, the imaging device 2 is powered on. In addition, if the near field communication function is displayed around the power button 2d such as, for example, the upper end of the circumferential surface part 7a, a user can easily understand a power-on operation.

In addition, since the NFC part is disposed at the upper side in the outer barrel 7, in a case where the imaging device 2 is used by installing a tripod in the above-described tripod hole 2e, the NFC part becomes as close to the display device 4 as possible easily, which is thus advantageous in noncontact communication.

Figure 37:
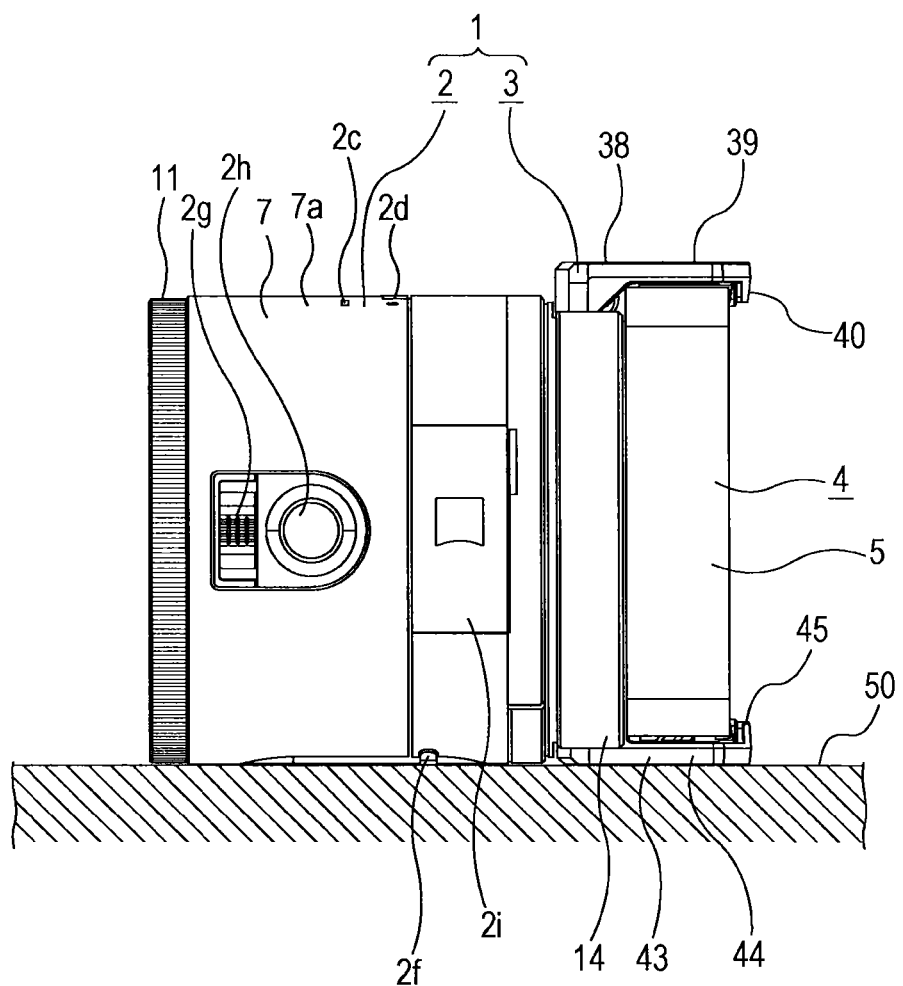
FIG. 37 is a schematic side view illustrating an example in which the imaging unit is used in a stationary state.

Further, as described later in FIG. 37, if a state of the imaging unit being put on a placing surface 50 is considered, a user typically makes the display device 4 close to the imaging device 2 from the upper side. Therefore, the NFC part is disposed at the upper side in the outer barrel 7, which also is an arrangement suitable for near field communication in such a usage.

In addition, as a position where the NFC part is disposed at the imaging device 2, examples other than the upper side in the outer barrel 7 may be considered, but, preferably, the NFC part is not disposed at least at a position close to the rear surface side of the outer barrel 7, that is, a position close to the rear surface part 7c side. This is because, if the NFC part which performs near field communication is disposed at the rear surface side, when the imaging device 2 is attached to the display device 4 via the adaptor 3, as in FIGS. 32, 33 and 37, the NFC part may be in a state of being close to the NFC part of the display device 4 side at all times, and thus polling may occur at all times. For this reason, the NFC part is preferably disposed at positions other than the rear surface side of the outer barrel 7.

Figure 11:
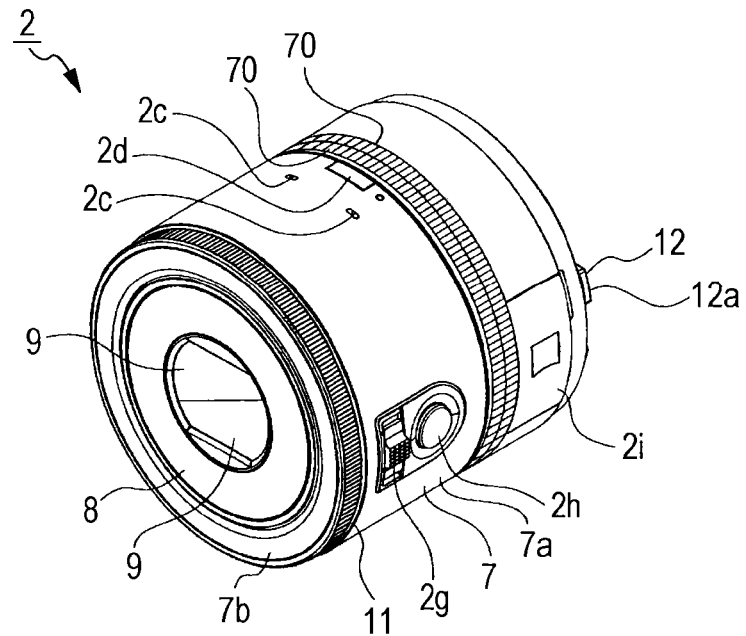
FIG. 11 is a perspective view illustrating an example of an imaging device provided with an operation ring.

In the imaging device 2, for example, operation rings 70 and 70 may be additionally provided to the above-described configuration (refer to FIG. 11). The operation rings 70 and 70 are rotatably supported so as to be arranged in the front and rear direction in the circumferential surface part 7a of the outer barrel 7. By performing a rotation operation of the operation rings 70 and 70, it is possible to perform changing of various modes in an image taking operation or reproduction, such as, for example, an automatic image taking mode, a panoraman image taking mode, a consecutive shot mode, a close-up mode, nighttime image taking mode, a background blurring mode, a self timer mode, a blur correction mode, a slide show mode, a still image taking mode, and a moving image taking mode.

As mentioned above, the operation rings 70 and 70 are used, and thus various modes can be changed, thereby further improving the convenience for a user in using the imaging device 2.

In addition, any number of operation rings 70 may be used, and if a plurality of operation rings 70, 70, . . . are provided, modes which can be set by combinations of respective operation positions of the operation rings 70, 70, . . . can be increased, and thus it is possible to improve functionality of the imaging device 2.

Figure 12:
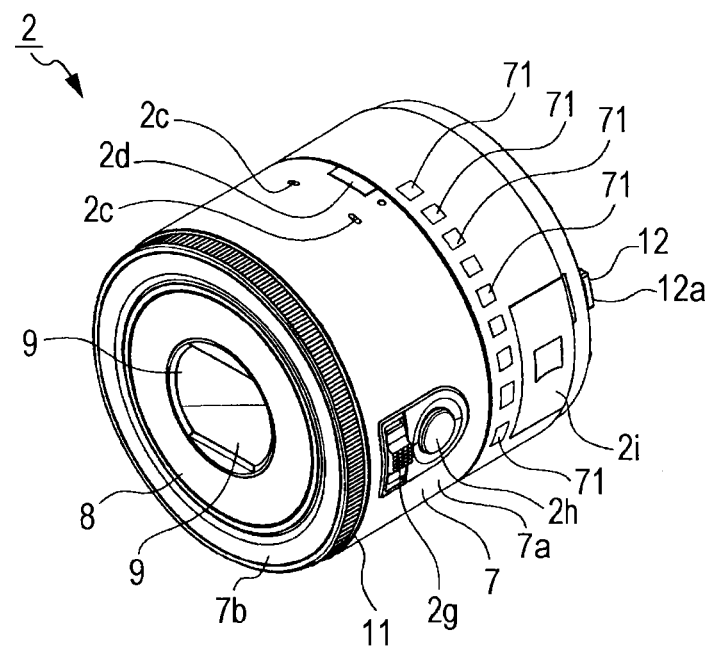
FIG. 12 is a perspective view illustrating an example of an imaging device provided with an operation button.

Further, operation buttons 71, for performing changing of the various modes may be provided instead of the operation rings 70 and 70 (refer to FIG. 12). The operation buttons 71, are provided, and thus it is also possible to further improve the convenience for a user in using the imaging device 2 in the same manner as providing the operation rings 70 and 70.

Configuration of Another Imaging Device

Although the imaging device 2 has been described above, the following imaging device 2A may be used as a configuration of the imaging unit 1 instead of the imaging device 2 (refer to FIGS. 13 to 19).

In addition, the imaging device 2A is the same as the imaging device 2 except that the imaging device 2A is shorter than the imaging device 2 and partially has a shape or a function from the imaging device 2. Therefore, a detailed description will be made of only portions different from the imaging device 2, and the other portions are given the same reference numerals as the reference numerals given to the same portions in the imaging device 2, and the description thereof will be made briefly or omitted.

The imaging device 2 and the imaging device 2A have, for example, different zoom magnification, and different image qualities of captured images.

The imaging device 2A includes an outer barrel 7A, a plurality of lens groups disposed inside the outer barrel 7A, and an imaging element (not illustrated) located on the rear side of the lens groups. In the imaging device 2A, light incorporated via the lens groups is subject to photoelectric conversion in the imaging element. Therefore, the imaging device 2A can capture an image data or a video data.

The outer barrel 7A includes a circumferential surface part 7a which is formed in a substantially cylindrical shape extending from the front side to the rear side, an overhang part 7b which overhangs inward from a front end of the circumferential surface part 7a, and a rear surface part 7c which closes the circumferential surface part 7a from the rear side. The outer barrel 7A is shorter than the outer barrel 7 in the front and rear direction.

Figure 13:
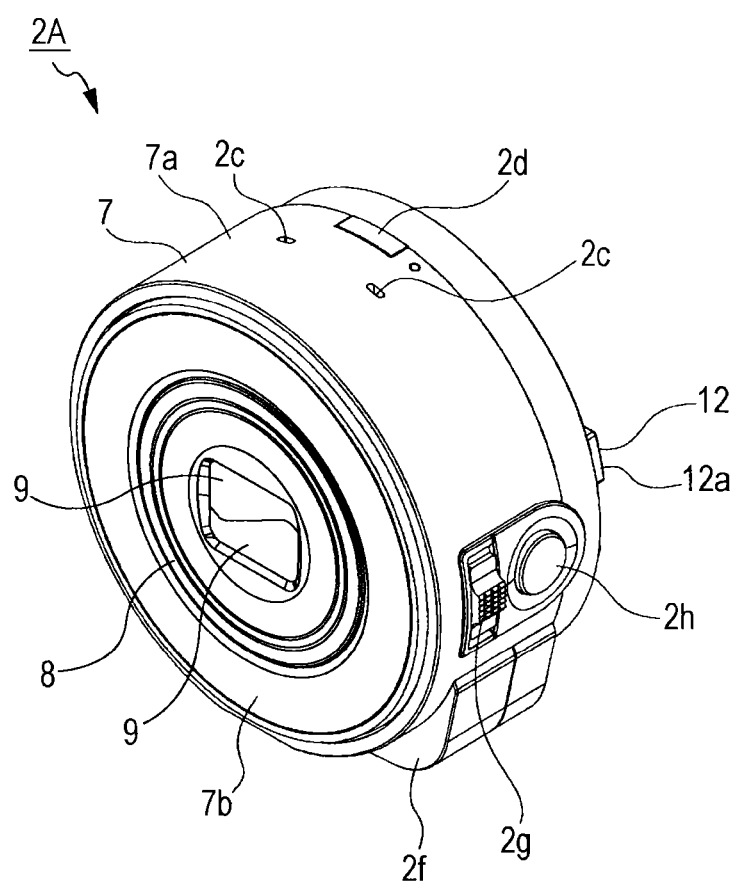
FIG. 13 is a perspective view of another imaging device.
Figure 14:
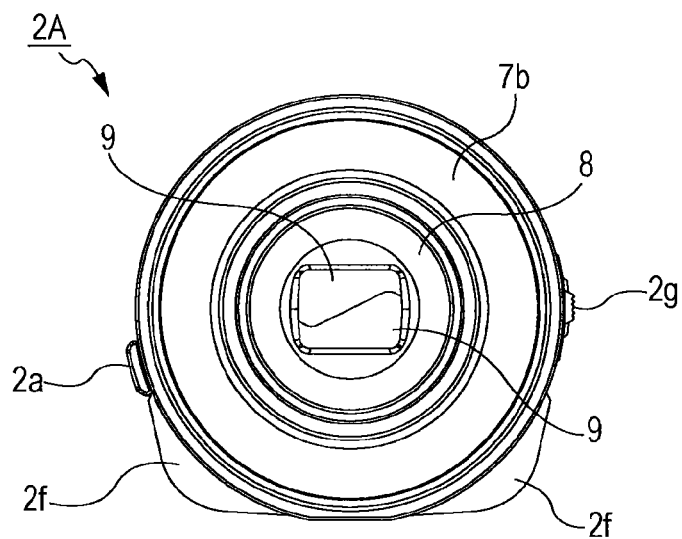
FIG. 14 is an enlarged front view of another imaging device.

Inner barrels 8 and 8 which are extendable in the front and rear direction are supported inside the outer barrel 7A (refer to FIGS. 13 and 14).

An operation ring is not supported in the outer barrel 7A. In addition, in the imaging device 2A, an operation ring may not be provided in the same manner as the imaging device 2.

Figure 15:
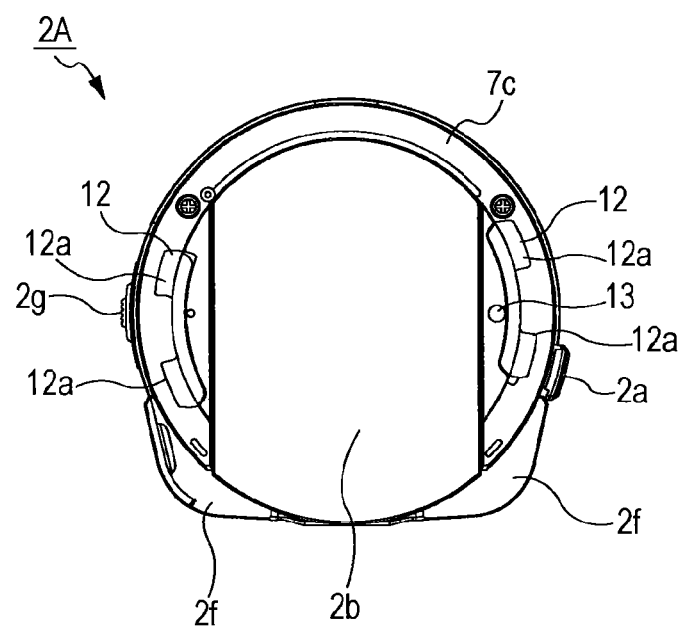
FIG. 15 is an enlarged rear view of another imaging device.

Coupling parts 12 and 12 which protrude backward are provided at positions opposite to each other, 180° apart on an outer circumference of the rear surface part 7c of the outer barrel 7A (refer to FIG. 15). A lock pin 13 is supported movably in the front and rear direction around the coupling part 12 of the rear surface part 7c.

Figure 19:
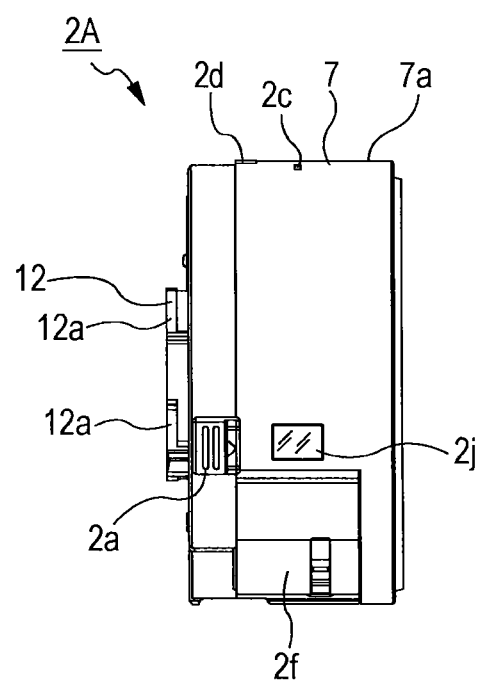
FIG. 19 is an enlarged right side view of another imaging device.

An unlock lever 2a is disposed at the rear end of the circumferential surface part 7a of the outer barrel 7A (refer to FIG. 19). The unlock lever 2a is operated, and thus the lock pin 13 is drawn into the outer barrel 7A.

A battery lid 2b is disposed at a portion between the coupling parts 12 and 12 of the rear surface part 7c of the outer barrel 7A (refer to FIG. 15). An external connection terminal and a memory card slot are provided inside the battery lid 2b in the imaging device 2A. In addition, in the imaging device 2A, in the same manner as the imaging device 2, a cover body may be provided on the rear side of the shutter button 2h, and an external connection terminal and a memory card slot may be provided inside the cover body.

Figure 16:
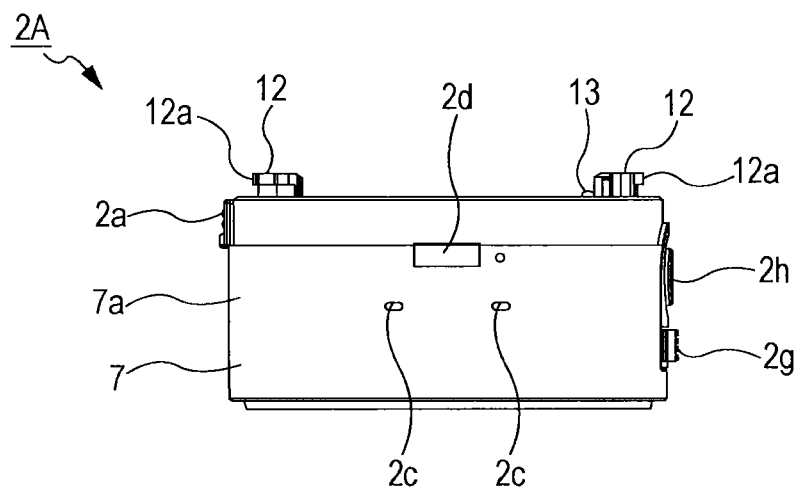
FIG. 16 is an enlarged plan view of another imaging device.

Microphones 2c and 2c and a power button 2d are disposed separately from each other in the front and rear direction at the upper end of the circumferential surface part 7a of the outer barrel 7A (refer to FIGS. 13 and 16).

Figure 17:
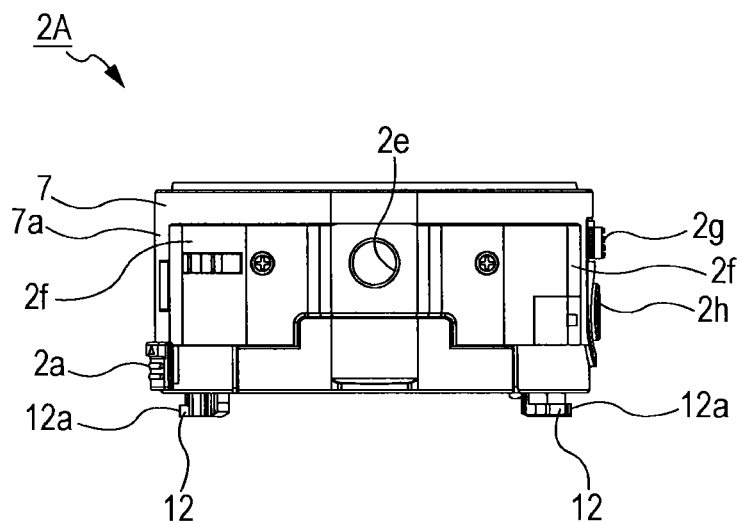
FIG. 17 is an enlarged bottom view of another imaging device.

A tripod hole 2e is formed at the lower end of the circumferential surface part 7a of the outer barrel 7A (refer to FIG. 17). Rolling prevention protrusions 2f and 2f are provided on right and left sides of the tripod hole 2e at the lower end of the circumferential surface part 7a of the outer barrel 7A (refer to FIGS. 14 and 17). The rolling prevention protrusions 2f and 2f protrude obliquely outward and downward. The imaging device 2A is prevented from rolling by the rolling prevention protrusions 2f and 2f when the imaging device 2A is placed on a desk or a table, and thus it is possible to prevent damage or a failure by the imaging device 2A falling off desk or table or the like.

Figure 18:
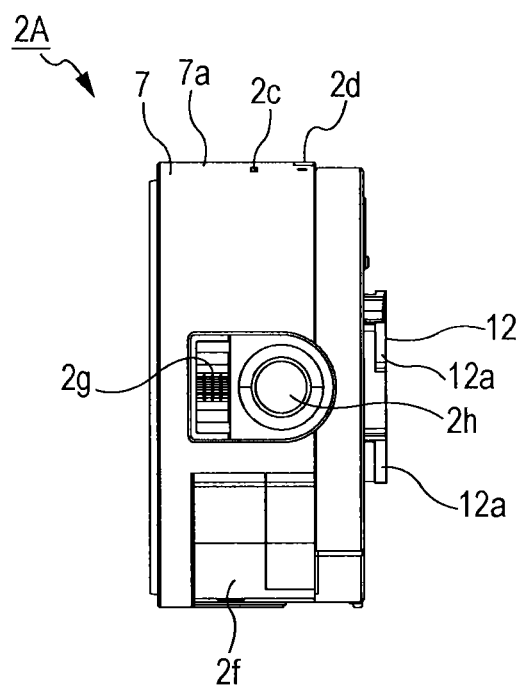
FIG. 18 is an enlarged left side view of another imaging device.

A zoom switch 2g and a shutter button 2h are arranged in the front and rear direction at the lower end of the circumferential surface part 7a of the outer barrel 7A (refer to FIGS. 13 and 18).

A display part 2j formed by a liquid crystal panel or the like is disposed at the right end of the circumferential surface part 7a of the outer barrel 7A (refer to FIG. 19).

The imaging device 2A has a wireless communication function using NFC, WIFI, a wireless local area network (LAN), or the like. By using the wireless communication, for example, it is possible to perform various operations such as displaying or preserving an image data or a video data captured by the imaging device 2A on the display device 4, executing an image taking function of the imaging device 2A by operating the display device 4, and executing the zooming function of the imaging device 2A by operating the display device 4.

Also in the imaging device 2A, in the same manner as the imaging device 2, the operation rings 70 or the operation buttons 71 may be provided, and thus various modes can be changed, thereby further improving the convenience for a user in using the imaging device 2.

Configuration of Adaptor

Figure 20:
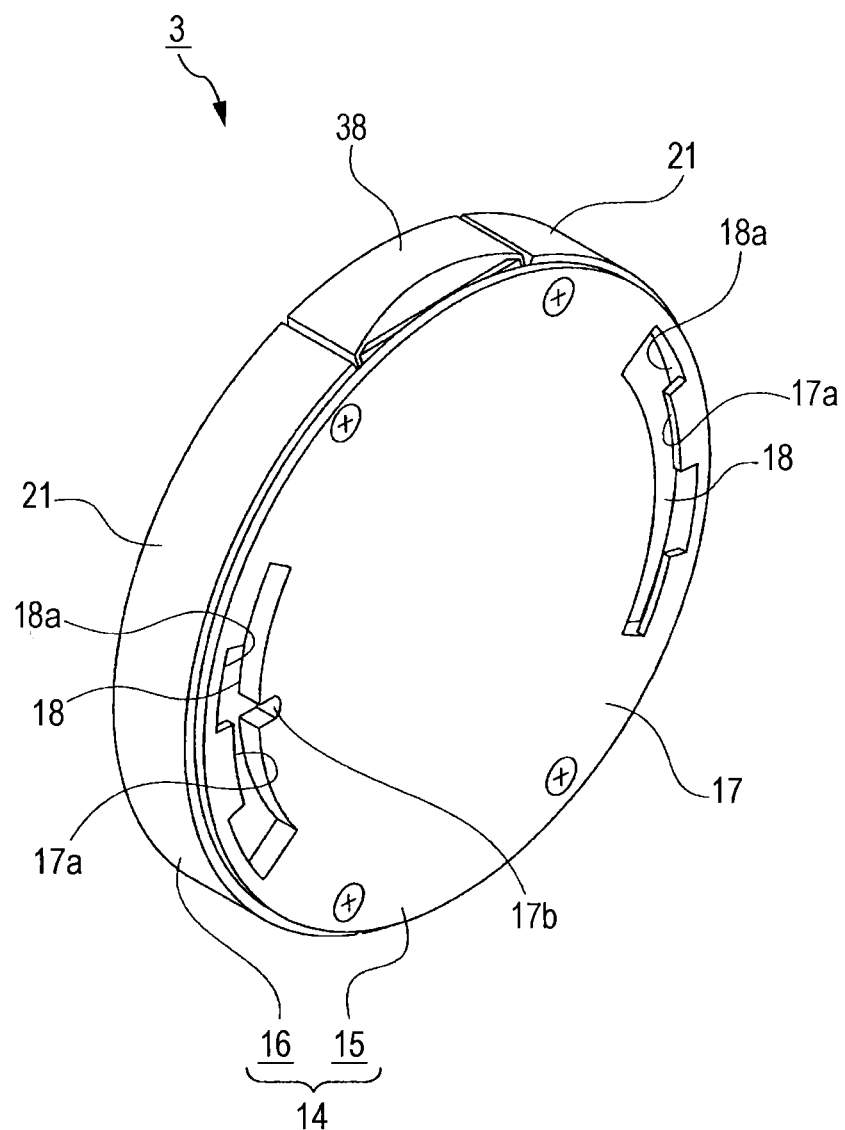
FIG. 20 is a perspective view of an adaptor.
Figure 21:
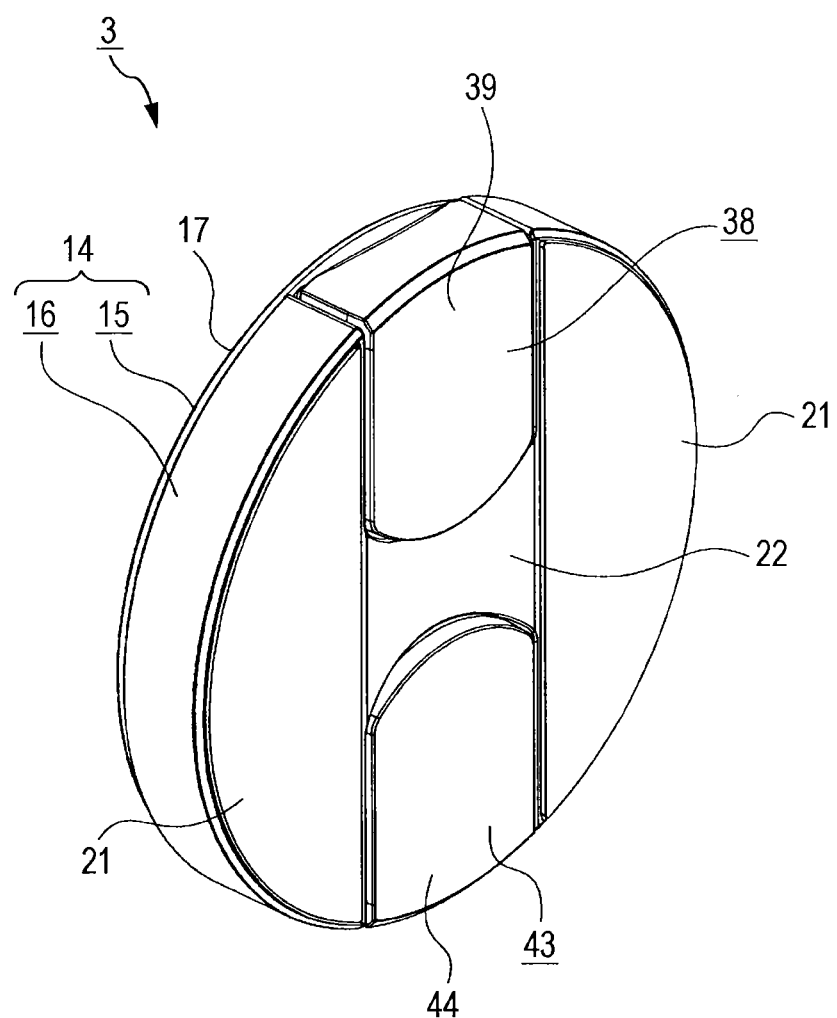
FIG. 21 is a perspective view illustrating a state in which the adaptor is viewed from a direction different from FIG. 20.
Figure 22:
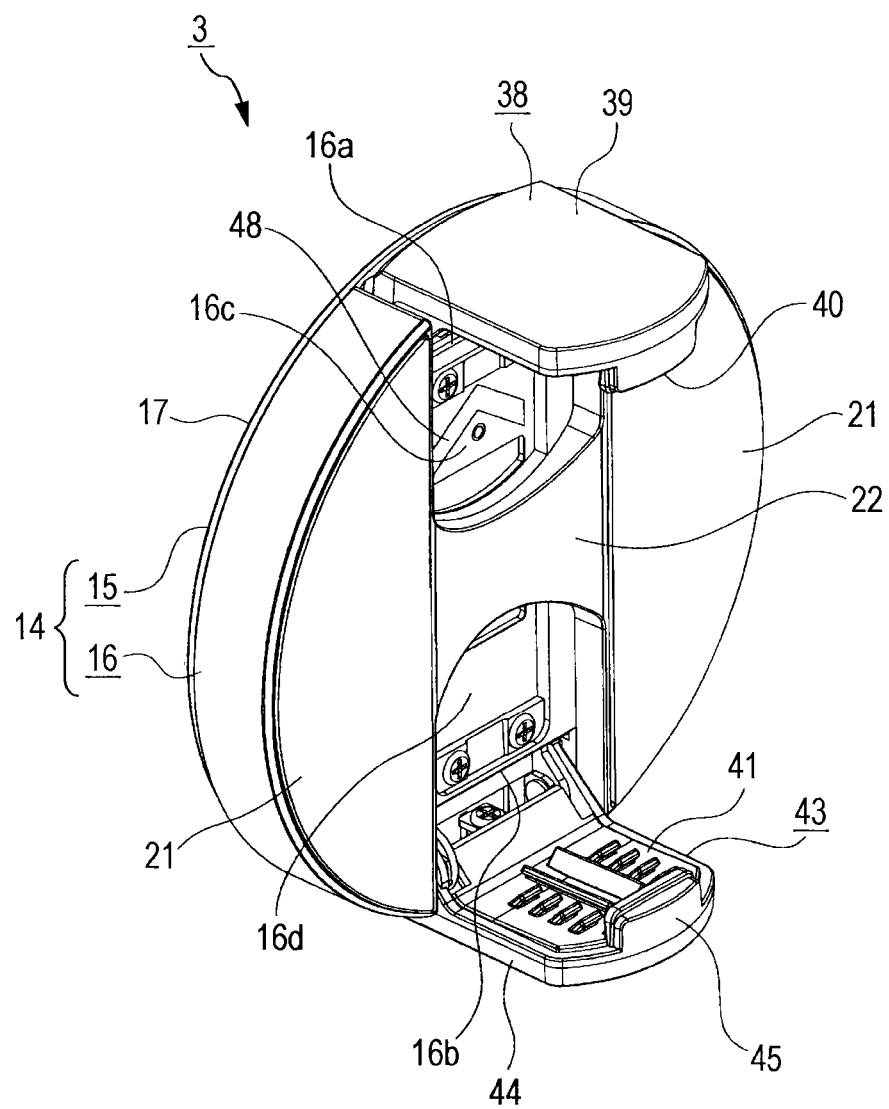
FIG. 22 is a perspective view of the adaptor illustrating a state in which attached bodies are rotatably moved to holding positions.

The adaptor 3 includes respective necessary parts disposed inside and outside a casing 14 (refer to FIGS. 20 to 22).

The casing 14 is formed by coupling a base body 15 located on the front side to a cover body 16 located on the rear side.

Figure 23:
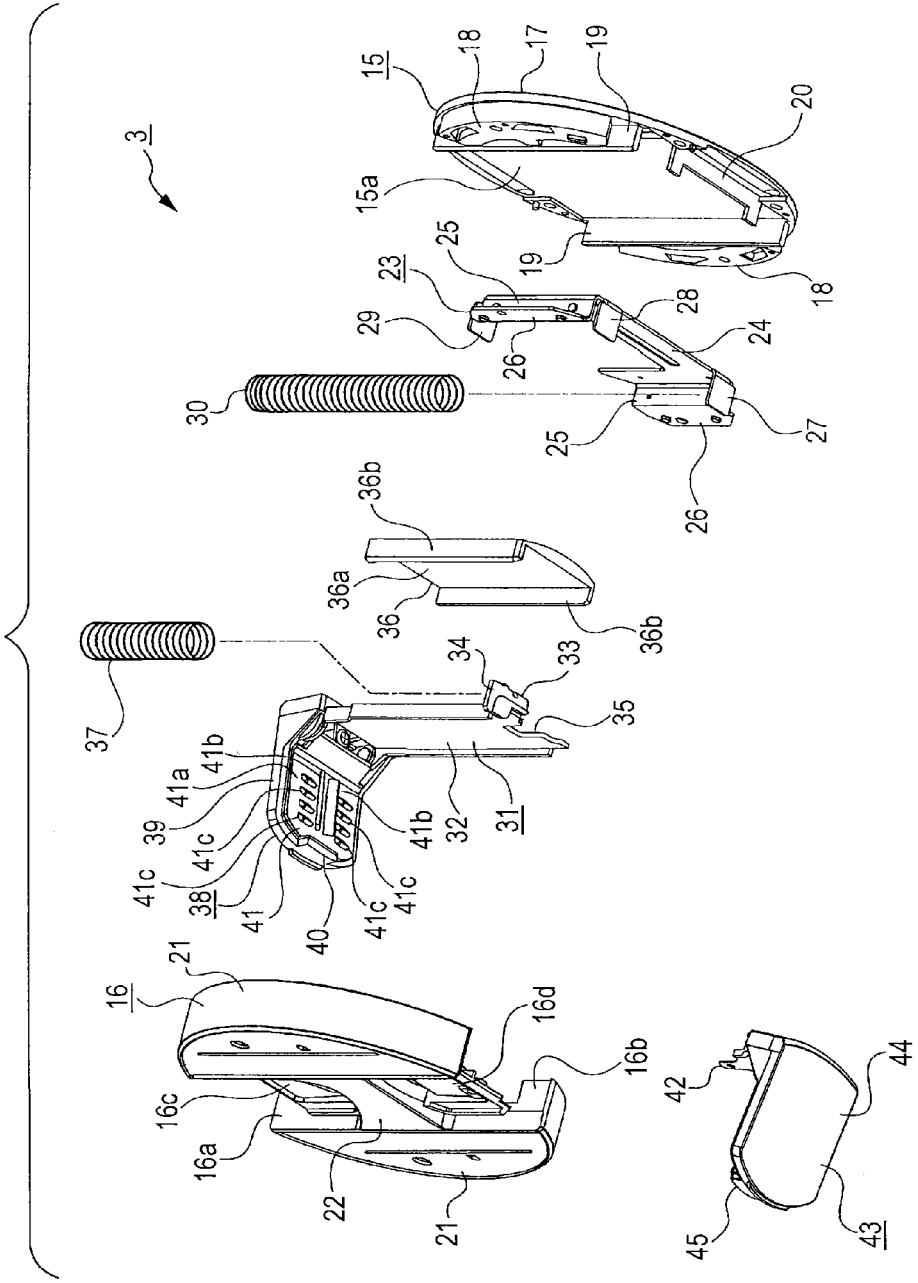
FIG. 23 is an exploded perspective view of the adaptor.

The base body 15 includes a base surface part 17 which is formed in a disc shape, projections 18 and 18 which protrude backward from the base surface part 17, guide piece parts 19 and 19 which are respectively provided inside the projections 18 and 18, and a protrusion piece part 20 which protrudes backward from the base surface part 17 (refer to FIG. 23).

The projections 18 and 18 are formed in shapes which protrude from positions opposite to each other, 180° apart on the outer circumference of the base surface part 17, and extend in the circumferential direction at both of right and left ends of the base surface part 17. The projection 18 is opened forward, and an inner space of the projection 18 is formed as a coupling recess part 18a (refer to FIG. 20).

Locking pieces 17a, 17a, . . . which cover a portion of the coupling recess part 18a from the front side are provided on the outer circumference of the base surface part 17. A locked hole 17b which communicates with the coupling recess part 18a is formed in the base surface part 17.

The guide piece parts 19 and 19 are formed in a plate shape which extends in the vertical direction (refer to FIG. 23).

The protrusion piece part 20 is formed in a plate shape which protrudes from the lower end of the base surface part 17 and extends in the horizontal direction.

A space surrounded by the guide piece parts 19 and 19 and the protrusion piece part 20 in the base body 15 is formed as a mechanism arranging space 15a. The protrusion piece part 20 has a function of shielding a mechanism disposed at the mechanism arranging space 15a from the outside and of preventing the mechanism disposed therein from being viewed from the outside of the adaptor 3.

Figure 24:
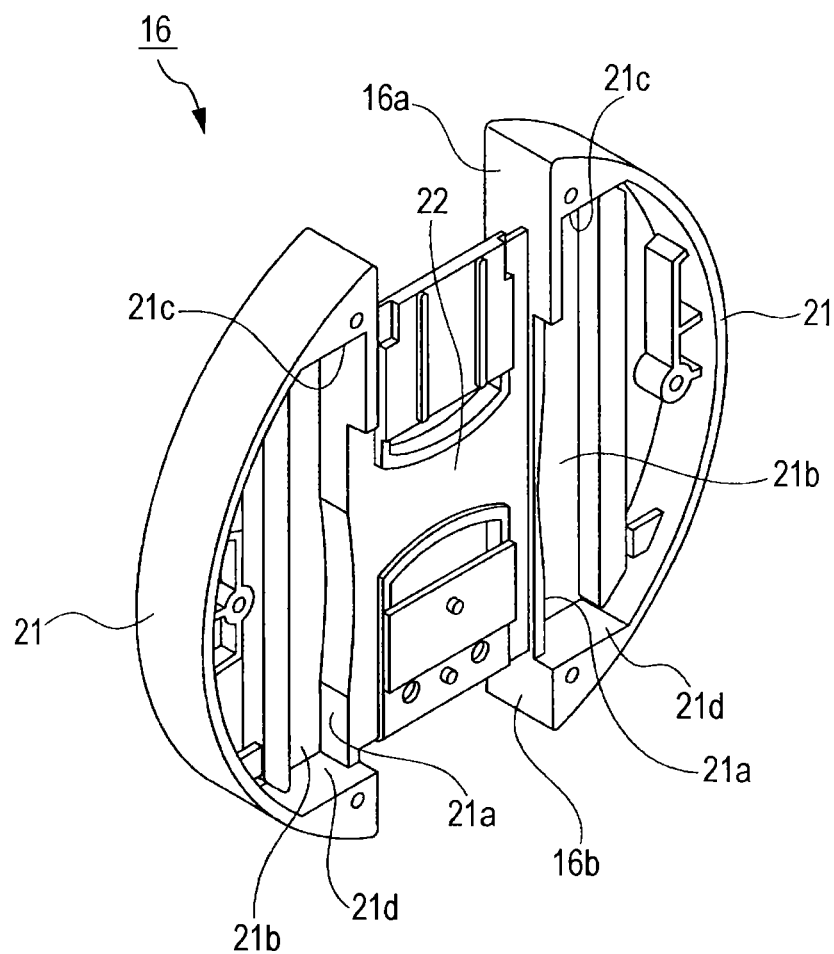
FIG. 24 is a perspective view of a cover body.

The cover body 16 has arrangement notches 16a and 16b whose exteriors are formed in a circular shape except for a portion thereof and which are respectively opened upward and downward at the upper end and lower end (refer to FIGS. 23 and 24).

A storage recess part 16c which is opened backward and upward continuously to the lower side of the arrangement notch 16a is formed in the cover body 16, and a storage recess part 16d which is opened backward and downward continuously to the upper side of the arrangement notch 16b is formed therein.

Both of right and left parts of the cover body 16 are respectively provided as arrangement parts 21 and 21, and the arrangement parts 21 and 21 are connected to each other via a connection part 22. The connection part 22 is a part between the storage recess parts 16c and 16d.

The arrangement part 21 is formed in a recess shape which is opened forward. A protrusion wall 21a which protrude forward and extends in the vertical direction is provided at the arrangement part 21.

An inner space of the protrusion wall 21a of the arrangement part 21 is formed as a spring arranging space 21b which is opened forward and is longitudinally long. Upper walls and lower walls forming the spring arranging spaces 21b and 21b formed in the arrangement parts 21 and 21 are respectively formed as spring receiving surfaces 21c and 21c and stopper surfaces 21d and 21d.

Figure 25:
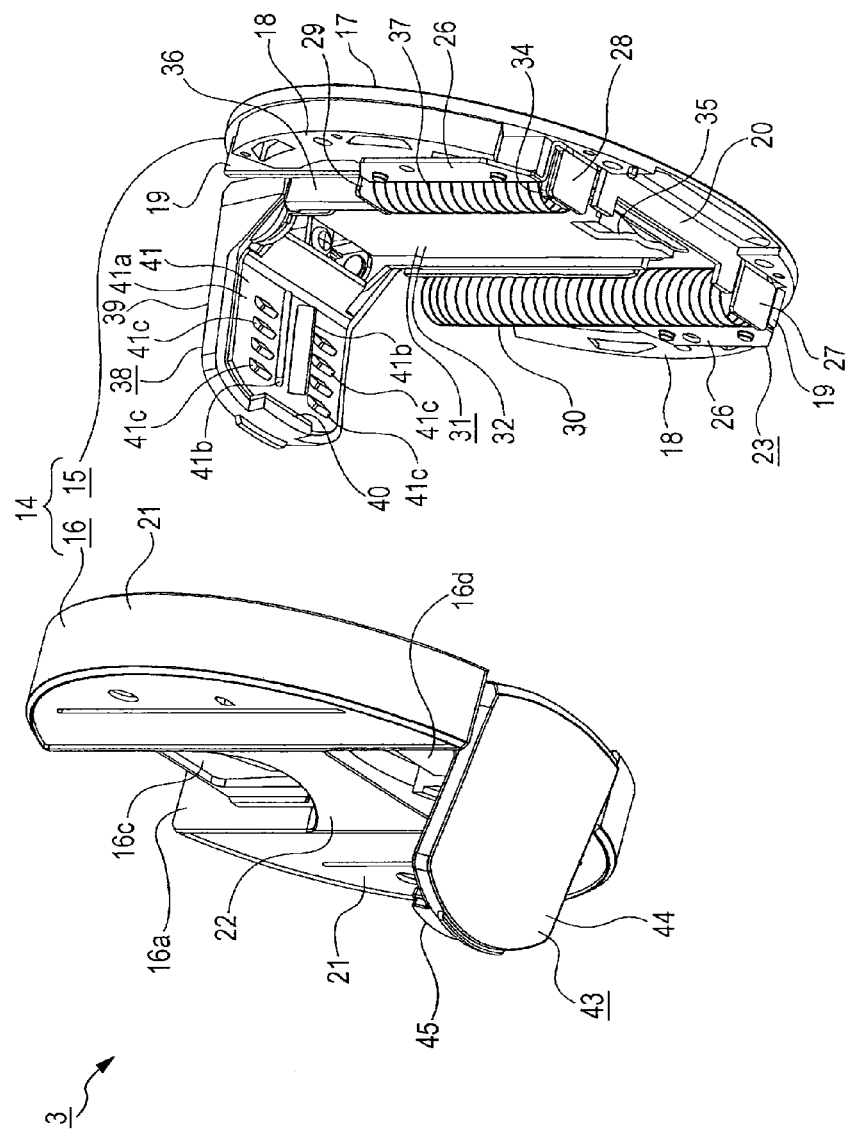
FIG. 25 is a perspective view of the adaptor illustrating a state in which the cover body is removed.

A first slider 23 is supported slidably in the vertical direction inside the casing 14 (refer to FIGS. 23 and 25). The first slider 23 has a supported surface part 24 which is formed in a C shape so as to be opened upward, side surface parts 25 and 25 which protrude backward from both of right and left ends of the supported surface part 24, and overhang parts 26 and 26 which protrude in directions of being separated from each other from upper ends of the side surface parts 25 and 25.

The first slider 23 is provided with a first spring receiving surface part 27 which protrudes backward from the lower end at the left end of the supported surface part 24. The first slider 23 is provided with a protrusion receiving surface part 28 which protrudes backward from the lower end at the right end of the supported surface part 24. The first slider 23 is provided with a second spring receiving surface part 29 which protrudes backward from the upper end at the right end of the supported surface part 24.

In the first slider 23, parts other than the overhang parts 26 and 26 are inserted into and disposed at the mechanism arranging space 15a, and the overhang parts 26 and 26 are disposed so as to cover the guide piece parts 19 and 19 of the base body 15 from the rear side. In the first slider 23, the side surface parts 25 and 25 are guided to the guide piece parts 19 and 19 so as to be slid in the vertical direction.

In a state in which the first slider 23 is disposed as described above, a first biasing spring 30 is disposed between the first spring receiving surface part 27 and one spring receiving surface 21c of the cover body 16. The first biasing spring 30 is, for example, a compression coil spring, and both ends thereof are pressed toward the first spring receiving surface part 27 and the spring receiving surface 21c. Therefore, the first slider 23 is biased downward by the first biasing spring 30. If the first slider 23 is biased downward by the first biasing spring 30, the first spring receiving surface part 27 is pressed toward the left stopper surface 21d of the cover body 16, and thus a downward movement of the first slider 23 is restricted.

A second slider 31 is supported slidably in the vertical direction on the rear side of the first slider 23 inside the casing 14. The second slider 31 has a base surface part 32 which is formed in a substantially rectangular shape which is longitudinally long, and a protrusion surface part 33 which protrude to the right from the right end at the lower end of the base surface part 32.

The second slider 31 is provided with a spring support surface part 34 which protrude backward from the lower end of the protrusion surface part 33. The second slider 31 is provided with a notch 35 for escape which is opened downward at the lower end of the base surface part 32.

In the second slider 31, the base surface part 32 is attached to and held in a decorative panel 36. The decorative panel 36 includes a holding base 36a which has a longitudinally long and substantially rectangular shape, and side wall parts 36b and 36b which protrude backward from both of right and left ends of the h36a. The base surface part 32 is held in the decorative panel 36 in a state of being installed on the rear surface of the holding base 36a and being surrounded from the lateral sides by the side wall parts 36b and 36b.

The second slider 31 is inserted into and disposed at the mechanism arranging space 15a in a state of being held in the decorative panel 36. The side wall parts 36b and 36b of the decorative panel 36 are guided to the respective inner surfaces of the arrangement parts 21 and 21 of the cover body 16, and thus the second slider 31 is slid in the vertical direction.

In a state in which the second slider 31 is disposed as described above, a second biasing spring 37 is disposed between the spring support surface part 34 and the second spring receiving surface part 29 of the first slider 23. The second biasing spring 37 is, for example, a compression coil spring, and both ends thereof are pressed toward the spring support surface part 34 and the second spring receiving surface part 29. Therefore, the second slider 31 is biased downward by the second biasing spring 37. If the second slider 31 is biased downward by the second biasing spring 37, the spring support surface part 34 is pressed toward the protrusion receiving surface part 28 of the first slider 23, as a result, the protrusion receiving surface part 28 is pressed toward the right stopper surface 21d of the base body 15, and thus a downward movement of the second slider 31 is restricted.

A spring force of the first biasing spring 30 is smaller than a spring force of the second biasing spring 37.

As described above, the first biasing spring 30 is disposed between the first spring receiving surface part 27 of the first slider 23 and one spring receiving surface 21c of the cover body 16, and the second biasing spring 37 is disposed between the spring support surface part 34 of the second slider 31 and the second spring receiving surface part 29 of the first slider 23. Therefore, the first biasing spring 30 and the second biasing spring 37 are connected in series to each other via the first slider 23. Therefore, the second slider 31 is biased downward by the first biasing spring 30 and the second biasing spring 37.

A first attached body 38 is supported rotatably at the upper end of the base surface part 32 of the second slider 31. The first attached body 38 has a pinch part 39 which is supported in the base surface part 32 and has a substantially plate shape, and a holding protrusion 40 which protrudes from a front end of the pinch part 39 in a direction perpendicular to the pinch part 39.

The first attached body 38 is disposed at the arrangement notch 16a formed in the cover body 16 in a state in which the base body 15 is coupled to the cover body 16.

The first attached body 38 may be stored in the storage recess part 16c in a first state so as to take a storage position (refer to FIG. 21) of being closed for the first slider 23. In other words, the first attached body 38 is in a state of being stored in the base body 15.

In addition, the first attached body 38 may take a holding position (refer to FIG. 22) of being opened for the first slider 23 in a second state. The first attached body 38 is rotatably moved between the storage position (first state) and the holding position (second state).

The first attached body 38 is in a state of protruding backward from the cover body 16 at the holding position.

Figure 26:
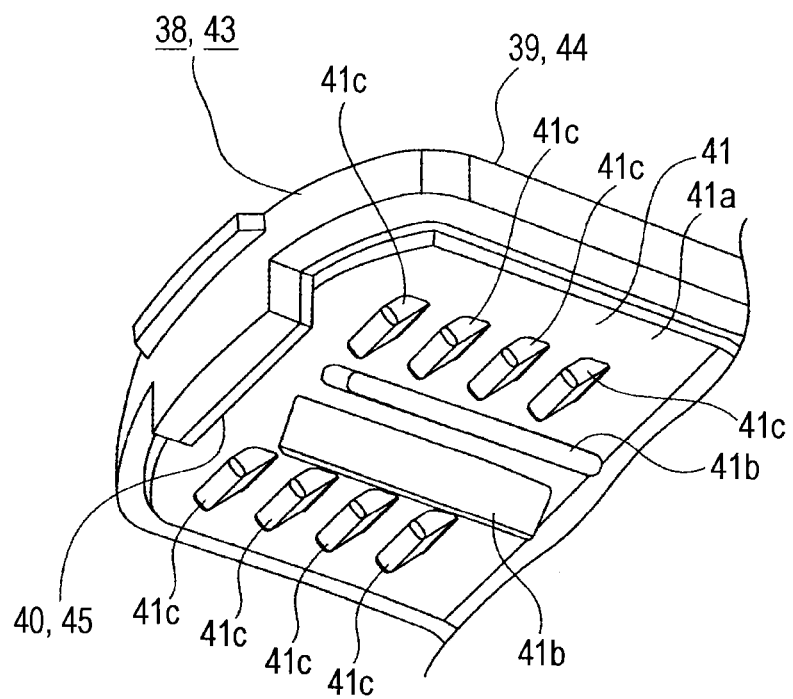
FIG. 26 is an enlarged perspective view of the attached body.

An elastic body 41 is provided inside the pinch part 39 (refer to FIG. 26). The elastic body 41 is formed by integrally forming a plate-shaped surface-shaped part 41a attached to the pinch part 39, pushing protrusions 41b and 41b which protrude from a central part of the surface-shaped part 41a in the horizontal direction, and pressing protrusions 41c, 41c, . . . which are located on the right and left sides of the pushing protrusions 41b and 41b which protrude from the surface-shaped part 41a together by using a rubber material.

The pushing protrusions 41b and 41b are elastically deformable, are provided separately from each other in the horizontal direction, and are formed so as to extend in the front and rear direction in a state in which the first attached body 38 is rotatably moved to the holding position. The pushing protrusions 41b and 41b are tilted so as to be horizontally separated from each other in the protruding directions.

The pressing protrusions 41c, 41c, . . . are elastically deformable, are provided separately from each other in the vertical direction, and are formed so as to extend in the horizontal direction. The pressing protrusions 41c, 41c, . . . are tilted so as to be close to the holding protrusion 40 in the protruding directions.

A support plate 42 is attached to the lower end side of the central part of the cover body 16 in the horizontal direction. A portion of the support plate 42 is located in the notch 35 for escape formed in the second slider 31 in a state in which the base body 15 is coupled to the cover body 16, and thus interference between the support plate 42 and the second slider 31 is prevented.

A second attached body 43 is rotatably supported at the lower end of the support plate 42. The second attached body 43 has a pinch part 44 which is supported in the support plate 42 and has a substantially plate shape, and a holding protrusion 45 which protrudes from a front end of the pinch part 44 in a direction perpendicular to the pinch part 44.

The second attached body 43 is disposed at the arrangement notch 16b formed in the cover body 16 in a state in which the base body 15 is coupled to the cover body 16. The second attached body 43 is stored in the storage recess part 16d, and is rotatably moved between a storage position (refer to FIG. 21) of being closed for the base body 15 and a holding position (refer to FIG. 22) of being opened for the base body 15. The second attached body 43 is in a state of protruding backward from the cover body 16 at the holding position.

The same elastic body 41 as that provided inside the pinch part 39 of the first attached body 38 is provided inside the pinch part 44 (refer to FIG. 26).

As described above, since the first attached body 38 and the second attached body 43 are respectively stored in the storage recess parts 16c and 16d, the adaptor 3 can be carried or kept in a state in which the first attached body 38 and the second attached body 43 are stored when not used, and thus it is possible to improve a handling property when not used.

In addition, since the first attached body 38 and the second attached body 43 are respectively stored in the storage recess parts 16c and 16d when the adaptor 3 is not used, the first attached body 38 and the second attached body 43 do not protrude from the cover body 16, and the first attached body 38 and the second attached body 43 can be prevented from being damaged or scratched.

Attachment and Detachment of Adaptor to and from Imaging Device

The adaptor 3 with the above-described configuration is coupled to the imaging device 2 or 2A in the following manner.

First, the coupling parts 12 and 12 of the imaging device 2 or 2A are respectively inserted into the coupling recess parts 18a and 18a formed in the base body 15 of the adaptor 3.

Next, the adaptor 3 is rotated about the imaging device 2 or 2A. If the adaptor 3 is rotated, the locking pieces 17a, 17a, . . . of the adaptor 3 are respectively engaged with the locking protrusions 12a, 12a, . . . of the imaging device 2 or 2A, and thus a movement of the adaptor 3 is restricted in the front and rear direction with respect to the imaging device 2 or 2A. In other words, the locking protrusions form a state of being engaged with the locking pieces 17a and 17a of the adaptor 3.

At this time, simultaneously, the lock pin 13 of the imaging device 2 or 2A is pressed by the base body 15, as a result, the lock pin 13 is drawn into the outer barrel 7 against a biasing force of the spring so that the adaptor 3 is rotated to a predetermined position and the locked hole 17b matches the lock pin 13. In addition, the lock pin 13 is made to protrude from the outer barrel 7 by the spring and is thus inserted into the locked hole 17b.

When the lock pin 13 is inserted into the locked hole 17b, rotation of the adaptor 3 for the imaging device 2 or 2A is restricted, and the adaptor 3 is coupled to the imaging device 2 or 2A in a locked state.

As described above, the imaging device 2 and the adaptor 3 are relatively rotated via the coupling parts 12 and 12, and thus the imaging device 2 and the adaptor 3 can be easily coupled to each other. In addition, the coupling state is maintained by the lock pin 13.

First and second coupling parts 12 and 12 which protrude backward are provided at positions opposite to each other, 180° apart on an outer circumference of the rear surface part 7c of the outer barrel 7 (refer to FIGS. 3 and 6). Locking protrusions 12a and 12a which protrude outward separately in a circumferential direction are respectively provided at the coupling parts 12 and 12. A lock pin 13 is supported movably in the front and rear direction around the coupling part 12 of the rear surface part 7c, and the lock pin 13 is biased backward by a spring (not illustrated).

The unlock lever 2a is operated so that the lock pin 13 is drawn into the outer barrel 7, and the adaptor 3 is rotated about the imaging device 2 or 2A in a direction opposite to the time of the coupling in the unlocked state, thereby performing decoupling of the adaptor 3 from the imaging device 2 or 2A. If the adaptor 3 is rotated about the imaging device 2 or 2A in a direction opposite to the time of the coupling, the engagement state between the locking pieces 17a, 17a, . . . and the locking protrusions 12a, 12a, . . . of the imaging device 2 or 2A is canceled. The adaptor 3 is moved backward with respect to the imaging device 2 or 2A in this state, and the coupling parts 12 and 12 are extracted from the coupling recess parts 18a and 18a, thereby decoupling the adaptor 3 from the imaging device 2 or 2A.

Operation During Attachment and Detachment of Adaptor to and from Display Device Hereinafter, a description will be made of an operation during attachment and detachment of the adaptor 3 to and from the display device 4 (refer to FIGS. 27 to 33).

Figure 27:
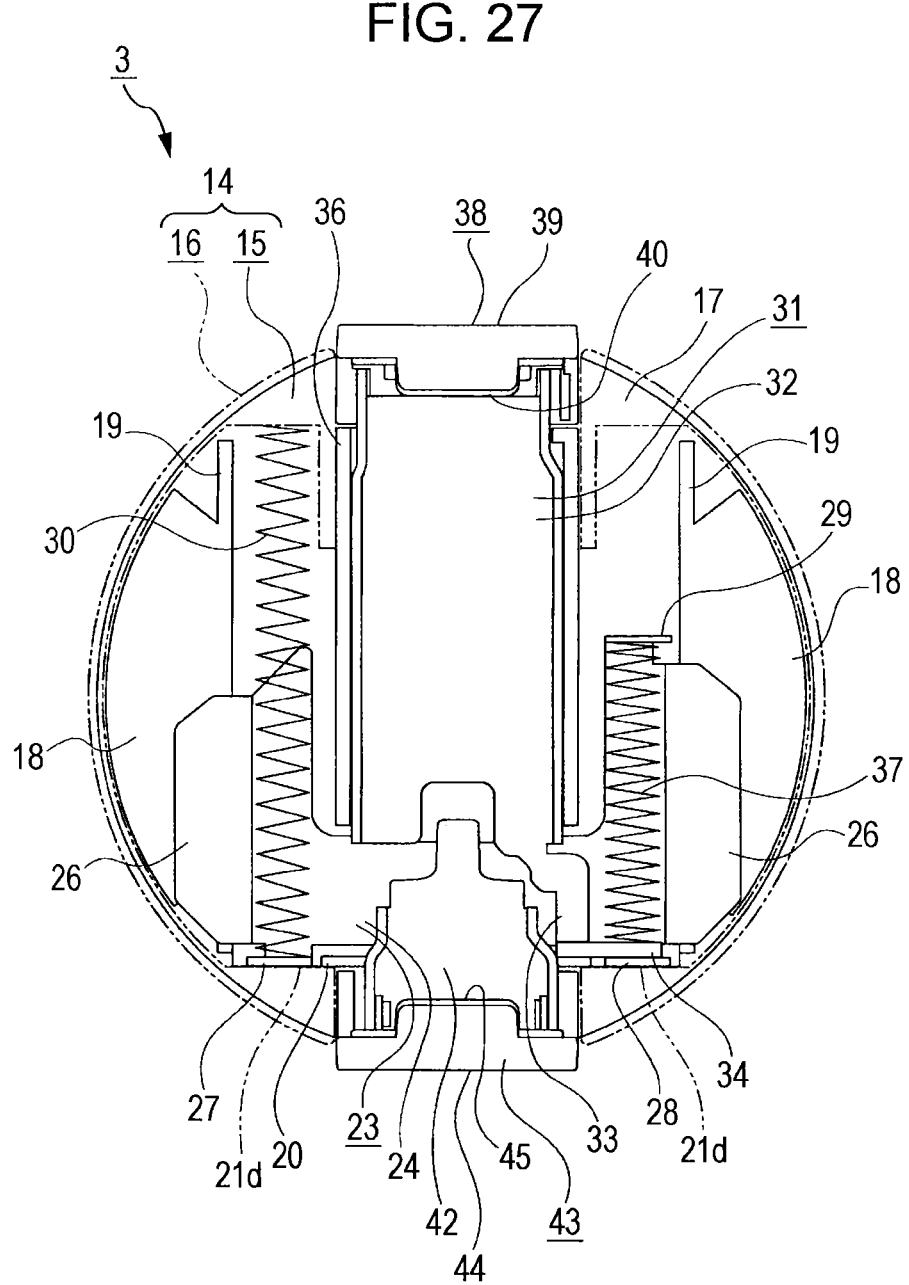
FIG. 27 is a schematic rear view of the adaptor.

In a state in which the adaptor 3 is not attached to the display device 4, a downward movement of the first slider 23 is restricted since the first spring receiving surface part 27 is pressed toward the left stopper surface 21d of the cover body 16 by the biasing force of the first biasing spring 30 (refer to FIG. 27). In this case, a downward movement of the second slider 31 is restricted since the spring support surface part 34 is pressed toward the protrusion receiving surface part 28 of the first slider 23 by the second biasing spring 37, and the protrusion receiving surface part 28 is pressed toward the right stopper surface 21d of the base body 15.

The first attached body 38 and the second attached body 43 are respectively extracted from the storage recess parts 16c and 16d of the cover body 16 and are rotatably moved to the holding positions, thereby performing attachment of the adaptor 3 to the display device 4.

When the adaptor 3 is attached to the display device 4, the first attached body 38 is grasped and moved upward.

Figure 28:
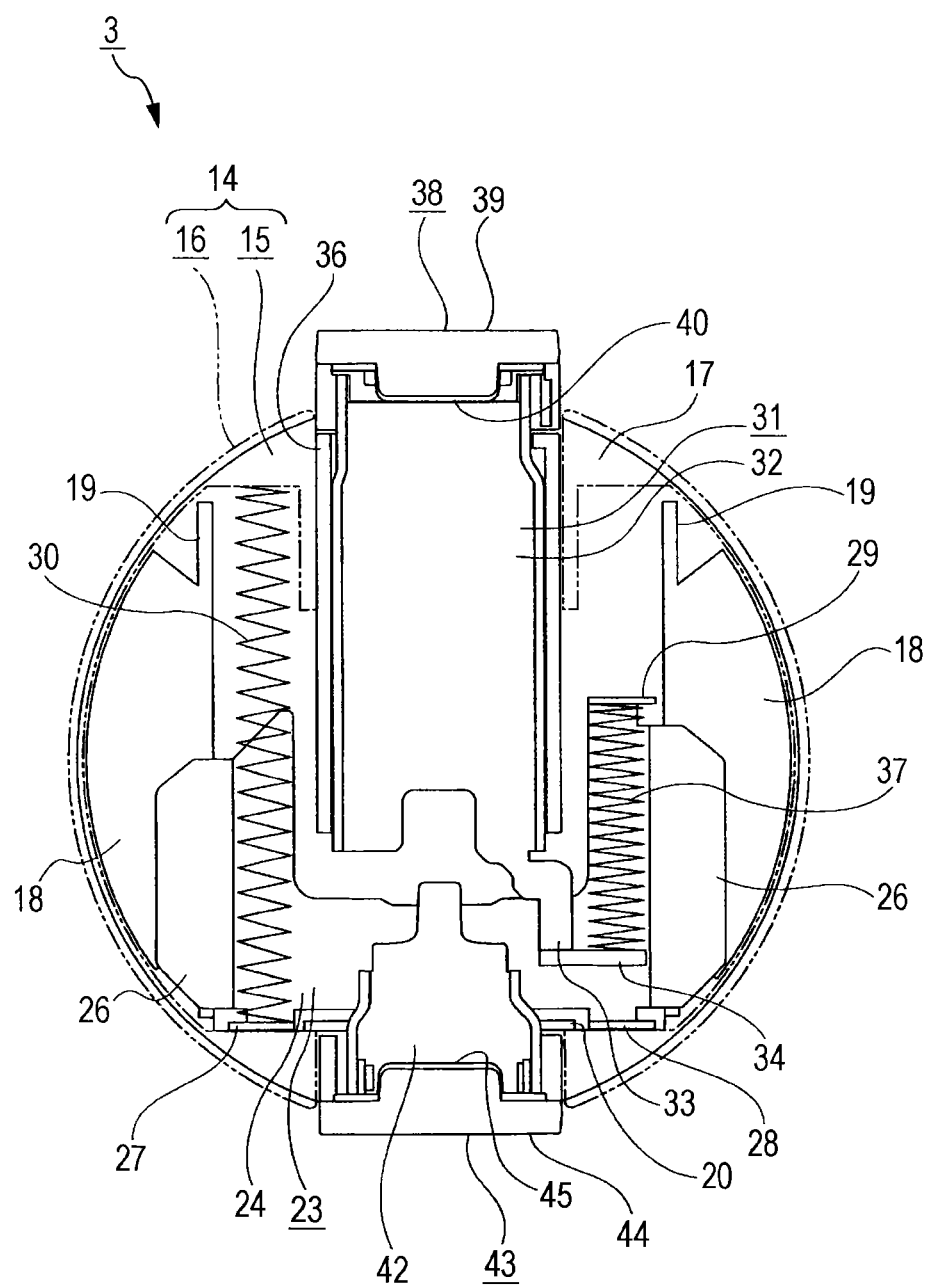
FIG. 28 is a schematic rear view illustrating a state in which a second slider is slid and thus a second biasing spring is compressed.

When the first attached body 38 is moved up, first, the second slider 31 is moved up along with the movement of the first attached body 38 (refer to FIG. 28). If the second slider 31 is moved upward, the second biasing spring 37 is compressed.

Figure 29:
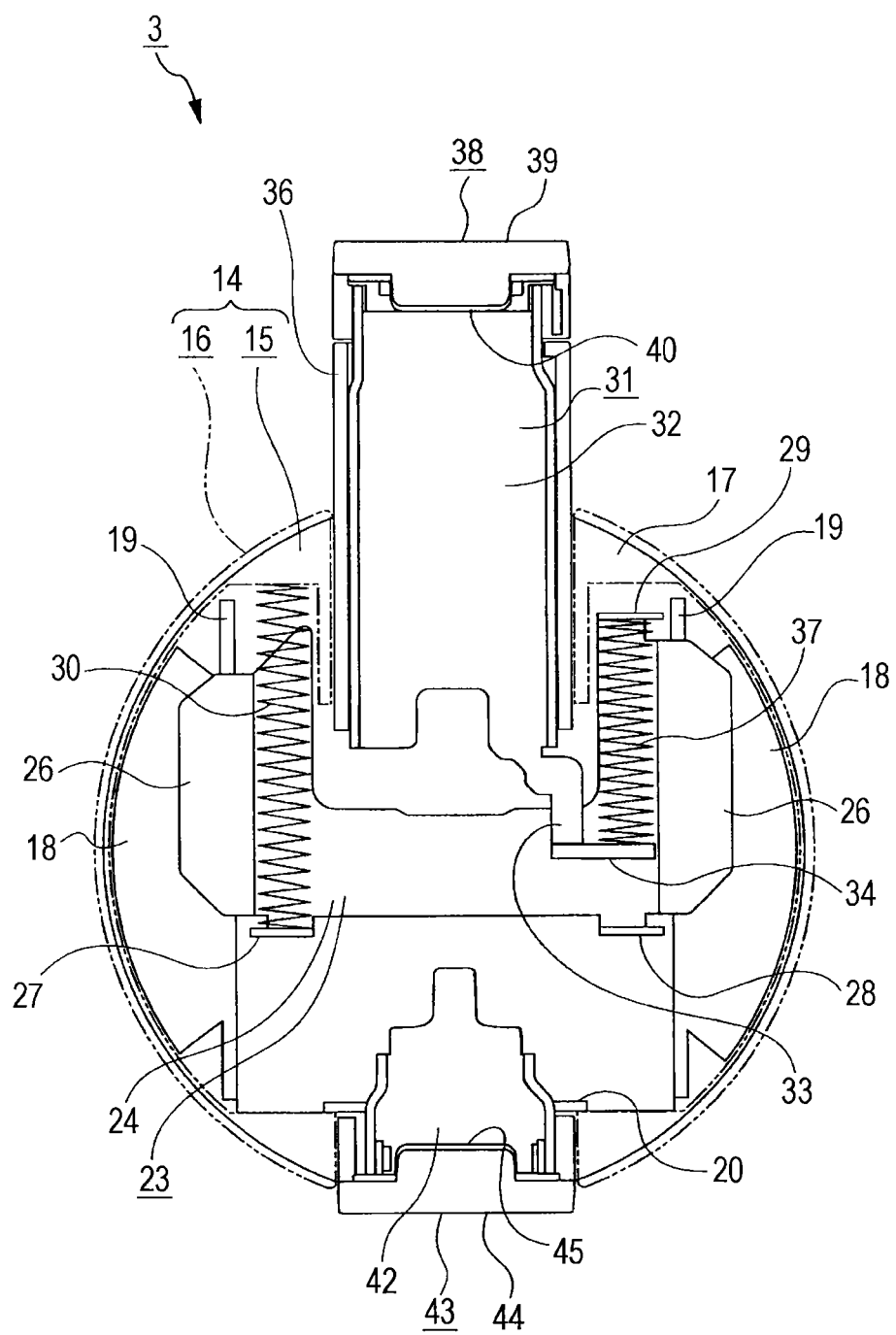
FIG. 29 is a schematic rear view illustrating a state in which the second slider and a first slider are slid and thus the second biasing spring and a first biasing spring are compressed.

Further, if the second slider 31 is moved upward along with the movement of the first attached body 38, the second biasing spring 37 is compressed, and, simultaneously, the second spring receiving surface part 29 is pressed upward and the first slider 23 is moved upward due to the compression of the second biasing spring 37 (refer to FIG. 29). When the first slider 23 is moved upward, the first biasing spring 30 is compressed. Therefore, the second biasing spring 37 and the first biasing spring 30 are simultaneously compressed.

As described above, if the first attached body 38 is moved upward, the first attached body 38 is spaced far apart from the second attached body 43. The first attached body 38 is moved upward to a position corresponding to a size of the display device 4 to be attached (refer to FIGS. 30 and 31).

Figure 32:
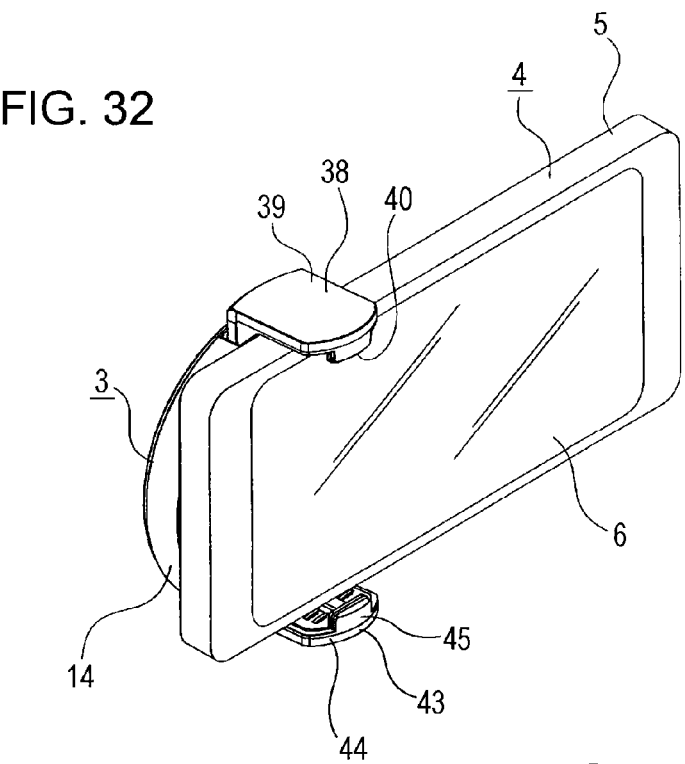
FIG. 32 is a perspective view illustrating a state in which the adaptor is attached to a small-sized display device.
Figure 33:
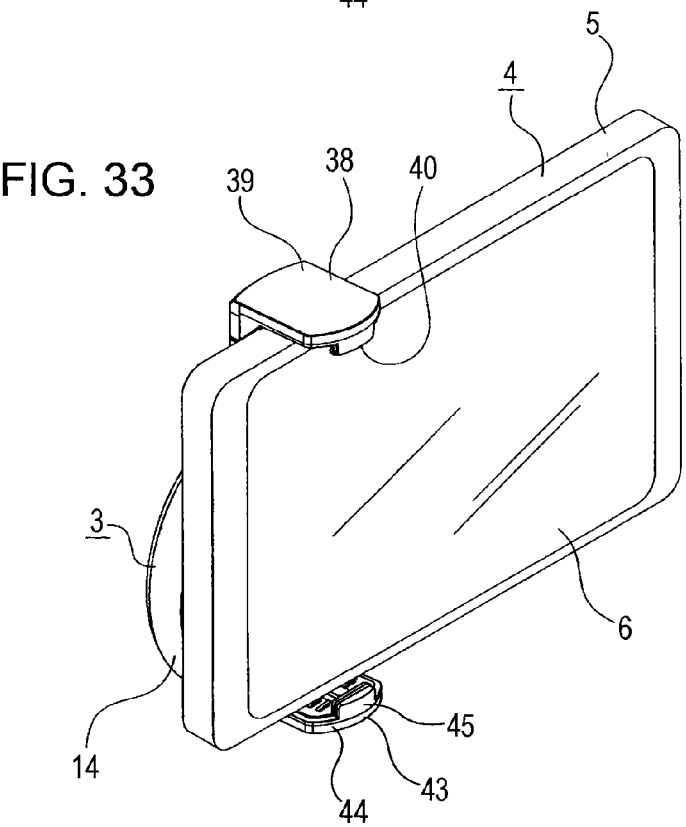
FIG. 33 is a perspective view illustrating a state in which the adaptor is attached to a large-sized display device.

Next, the display device 4 is pinched by the first attached body 38 and the second attached body 43, and thus the adaptor 3 is attached to the display device 4 (refer to FIGS. 32 and 33). At this time, the first attached body 38 is biased to the second attached body 43 in a direction of being close thereto by the first biasing spring 30 and the second biasing spring 37, and the elastic bodies 41 and 41 are in close contact with the display device 4.

In a state in which the adaptor 3 is attached to the small-sized display device 4, a gap between the first attached body 38 and the second attached body 43 is small (refer to FIG. 32), and, in a state in which the adaptor 3 is attached to the large-sized display device 4, a gap between the first attached body 38 and the second attached body 43 is large (refer to FIG. 33).

In a state in which the adaptor 3 is attached to the display device 4, the holding protrusion 40 of the first attached body 38 and the holding protrusion 45 of the second attached body 43 is in a state of going around to the rear surface side of the display device 4. Therefore, the adaptor 3 is prevented from falling forward from the display device 4.

As illustrated in FIG. 32 or FIG. 33, when attached to the display device 4, the adaptor 3 has a configuration in which the second attached body 43 is set to a fixed position, and the first attached body 38 side is extended. Only the first attached body 38 which is an upper side is extended and contracted, and a gap between the first attached body 38 and the second attached body 43 is adjusted. Therefore, an imaging optical axis of the imaging device 2 is located at a position which is equal to or lower than a central point in the height direction (the short side direction of the casing of the display device 4) of the display panel 6 of the display device 4. In addition, a bottom position of the imaging device 2 and a bottom position of the display device 4 substantially match each other regardless of a size of the display device 4.

For this reason, a user can easily and stably hold the display device 4 attached with the imaging unit 1 regardless of the display device 4. In addition, even in a case where the display device 4 attached with the imaging unit 1 is placed on a desk or the like as it is, a posture thereof is stable, and thus the display device 4 attached therewith is also suitable for imaging in this state.

In addition, the second attached body 43 is set to a fixed position, and thus there is an advantage in that an attachment state of the adaptor 3 to the display device 4 is stable.

Figure 30:
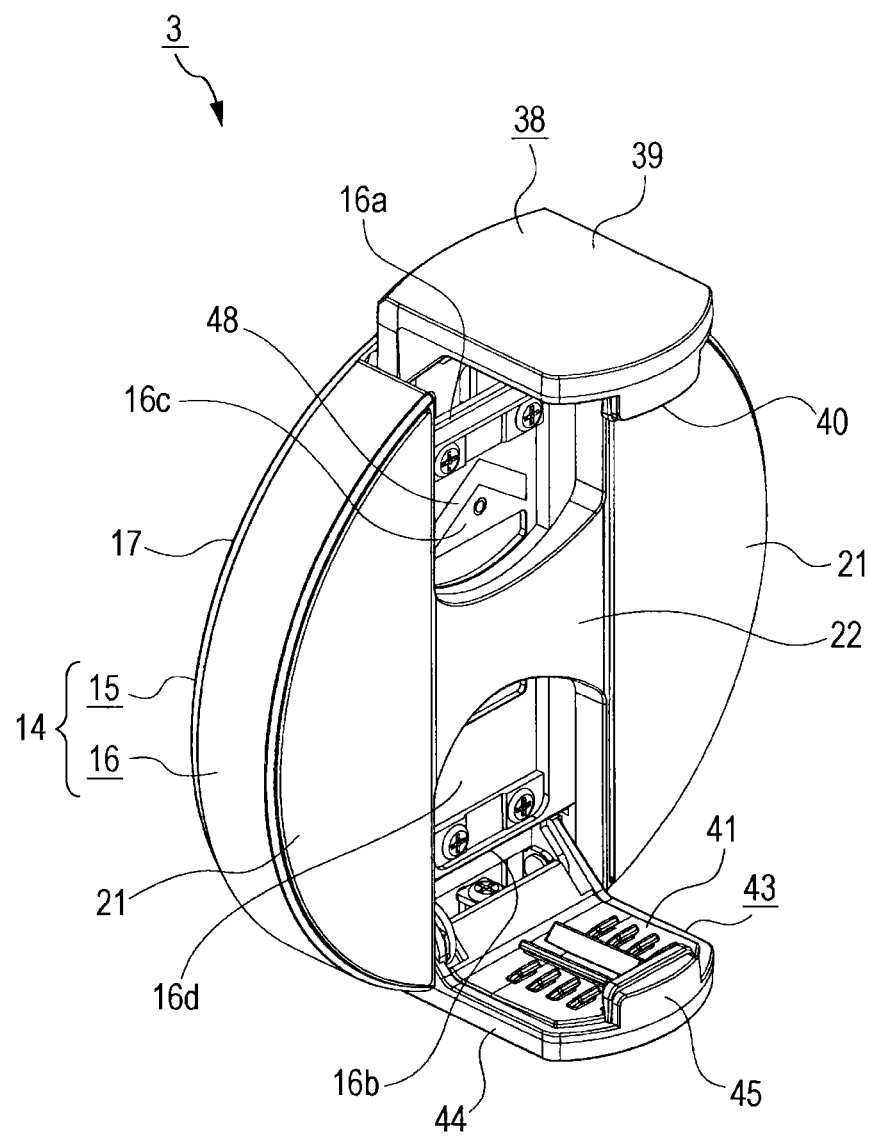
FIG. 30 is a perspective view illustrating a state in which a gap between a pair of attached bodies is widened.
Figure 31:
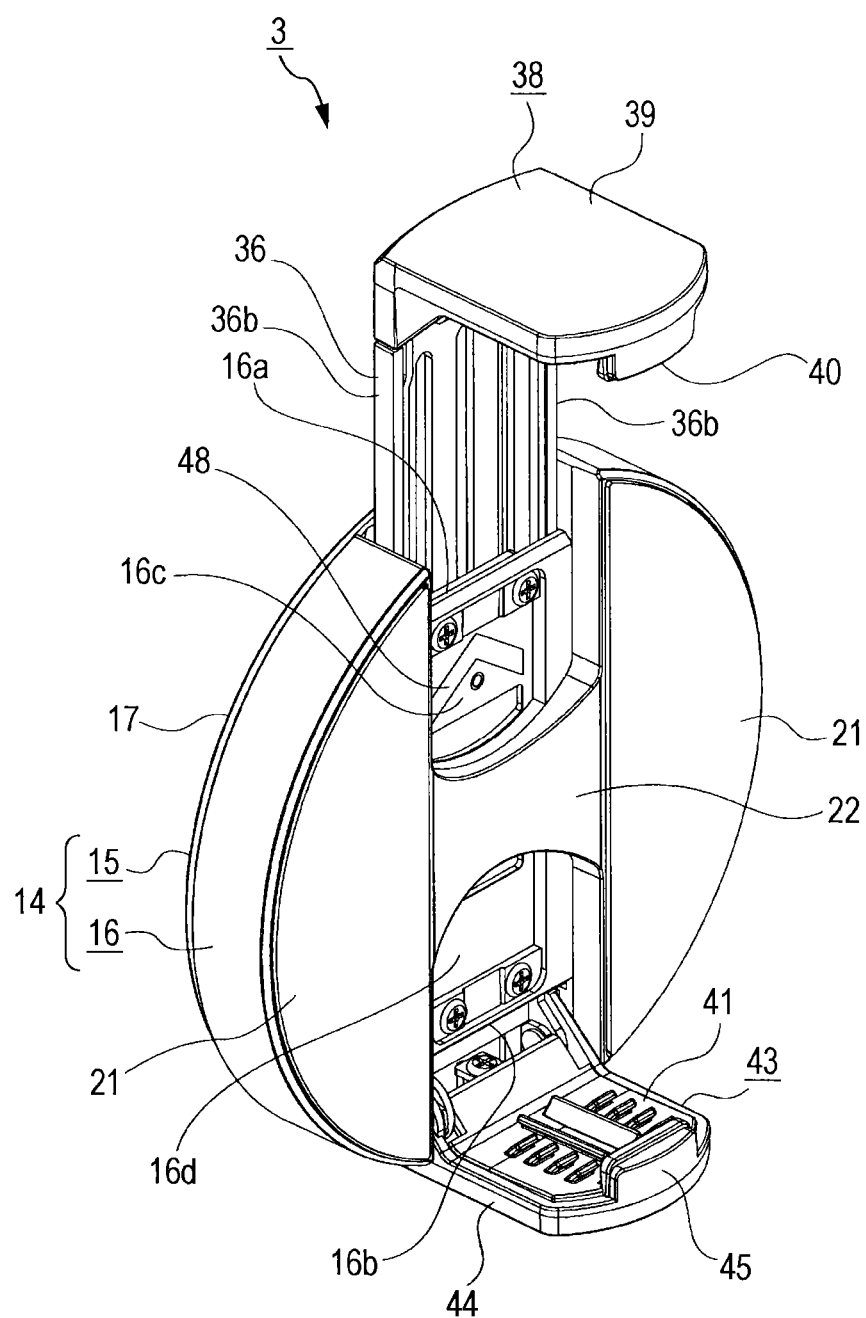
FIG. 31 is a perspective view illustrating a state in which a gap between the pair of attached bodies is further widened.

A mark 48 which indicates a configuration in which the first attached body 38 side extends upward is provided at the adaptor 3 as illustrated in FIGS. 30 and 31. The mark 48 allows a user to recognize that a position of the first attached body 38 extends upward, and thus the user can easily understand an attached part during attachment to the display device 4. Therefore, it is possible to improve usability.

The first attached body 38 is grasped, and the first attached body 38 is moved upward along with the second slider 31 so that the display device 4 is extracted between the first attached body 38 and the second attached body 43, thereby removing the adaptor 3 from the display device 4. If the upward force given to the first attached body 38 is removed after the display device 4 extracted between the first attached body 38 and the second attached body 43, the first attached body 38 is moved downward along with the second slider 31 and the first slider 23, and the first slider 23 and the second slider 31 are returned to an original state before being attached to the display device 4, by the biasing forces of the first biasing spring 30 and the second biasing spring 37.

Operation due to series connection between first biasing spring and second biasing spring As described above, in the adaptor 3, the first biasing spring 30 and the second biasing spring 37 are connected in series to each other via the first slider 23, and the second biasing spring 37 and the first biasing spring 30 are simultaneously compressed due to a sliding operation of the first slider 23.

A description will be made of an operation when the second biasing spring 37 and the first biasing spring 30 are simultaneously compressed (refer to FIG. 34).

Figure 34:
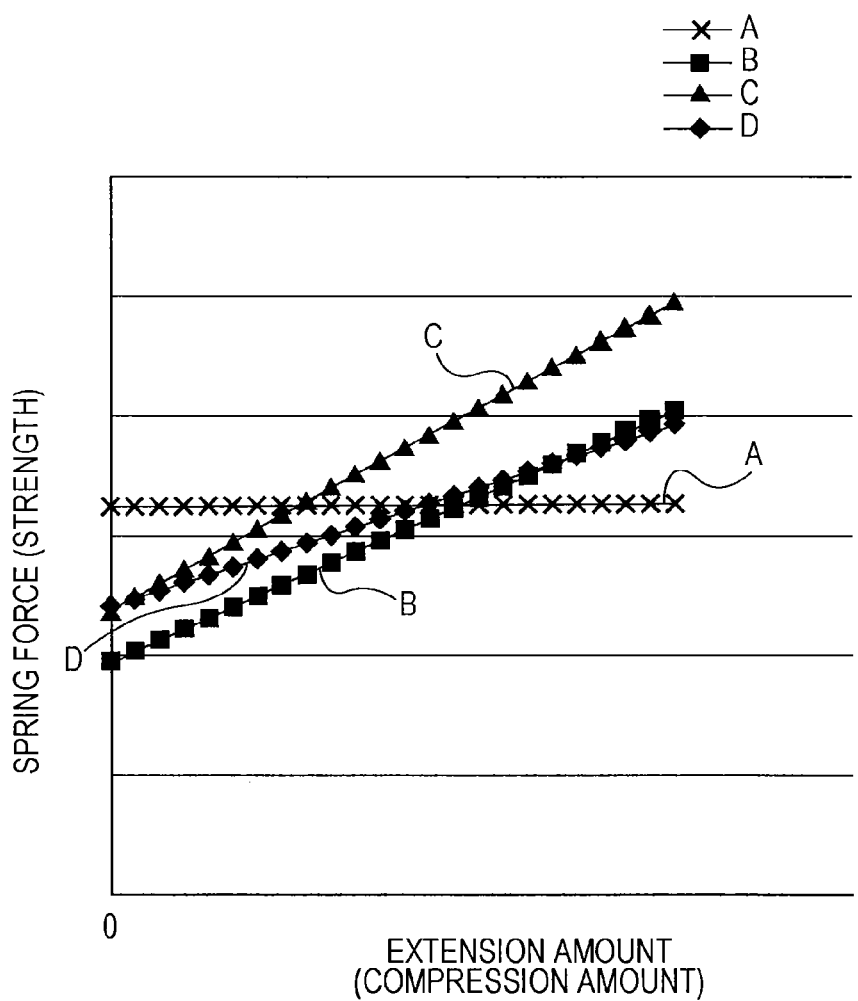
FIG. 34 is a graph illustrating a relationship between an extension amount and a spring force of a spring.

FIG. 34 is a graph in which a transverse axis expresses an extension amount (compression amount) and a longitudinal axis expresses a spring force (strength). In the imaging unit 1, the display devices 4 having different sizes are preferably pinched at a constant force by the first attached body 38 and the second attached body 43, and, ideally, a spring force is constant even in a state in which an extension amount of the spring varies (state A).

The state B and the state C illustrated in the graph respectively indicate relationships between extension amounts of the first biasing spring and the second biasing spring having different spring forces and strengths, and are considerably tilted relative to the state A.

On the other hand, the state D indicates a relationship between an extension amount and a strength when the first biasing spring and the second biasing spring are connected in series to each other, and the state D has a tilt angle relative to the state A, smaller than the states B and C, and is thus a state close to the ideal state A.

Therefore, as in the adaptor 3, the first biasing spring 30 and the second biasing spring 37 are connected in series to each other, and the second biasing spring 37 and the first biasing spring 30 are simultaneously compressed due to the sliding operation of the first slider 23. Thus, a variation in a downward biasing force to the first attached body 38 is small when a gap between the first attached body 38 and the second attached body 43 varies.

Operation of Pushing Protrusion and Pressing Protrusion of Adaptor

As described above, in a state in which the display device 4 is pinched by the first attached body 38 and the second attached body 43, and the adaptor 3 is attached to the display device 4, the pushing protrusions 41b, 41b, . . . and the pressing protrusions 41c, 41c, . . . of the elastic bodies 41 and 41 are in close contact with the display device 4.

Figure 35:
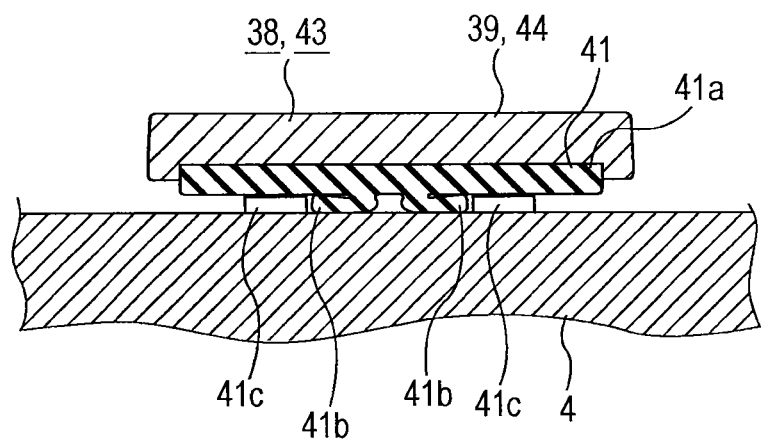
FIG. 35 is an enlarged cross-sectional view illustrating a state in which a pushing protrusion part is close contact with a display device.

In a state in which the display device 4 is in close contact with the pushing protrusions 41b, since the pushing protrusions 41b, 41b, . . . are elastically deformable, and the second attached body 43 is biased in a direction of being close to the first attached body 38 by the first biasing spring 30 and the second biasing spring 37, the pushing protrusions 41b, 41b, . . . which are tilted with respect to the protruding direction from the surface-shaped part 41a are elastically deformed, and are crushed between the display device 4 and the surface-shaped part 41a (refer to FIG. 35).

Therefore, a contact area of the pushing protrusions 41b, 41b, . . . with the display device 4 increases, and it is possible to effectively prevent the adaptor 3 from falling off the display device 4.

In addition, although, in the above description, the arranged pushing protrusions 41b and 41b are tilted so as to be separated from each other in the arrangement direction and in the protruding directions from the surface-shaped part 41a, conversely, the arranged pushing protrusions 41b and 41b may be tilted so as to be close to each other in the arrangement direction and in the protruding directions from the surface-shaped part 41a.

Figure 36:
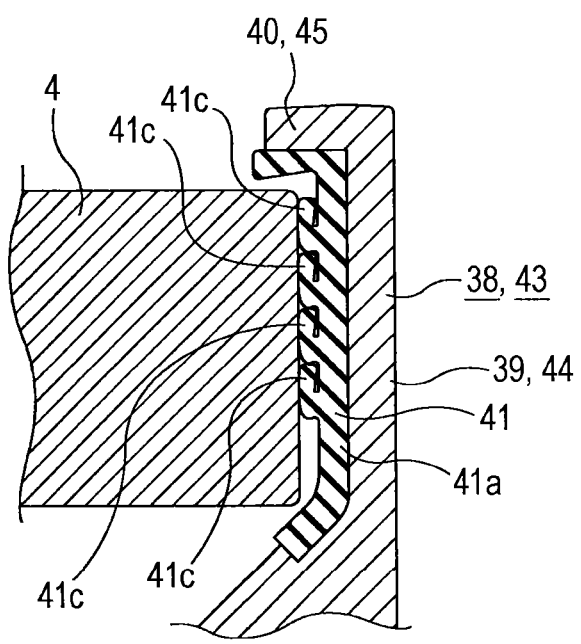
FIG. 36 is an enlarged cross-sectional view illustrating a state in which a pressing protrusion part is close contact with a display device.

Further, in a state in which the pressing protrusions 41c, 41c, . . . are in close contact with the display device 4, since the since the pressing protrusions 41c, 41c, . . . are elastically deformable, and the second attached body 43 is biased in a direction of being close to the first attached body 38 by the first biasing spring 30 and the second biasing spring 37, the pressing protrusions 41c, 41c, . . . which are tilted with respect to the protruding direction from the surface-shaped part 41a are elastically deformed, and are crushed between the display device 4 and the surface-shaped part 41a (refer to FIG. 36).

Therefore, a contact area of the pressing protrusions 41c, 41c, . . . with the display device 4 increases, and it is possible to effectively prevent the adaptor 3 from falling off the display device 4.

In addition, since the pressing protrusions 41c, 41c, . . . are tilted so as to be separated from each other at rotatable movement points of the first attached body 38 and the second attached body 43 about the first slider 23 or the base body 15 in the protruding directions, it is difficult for the first attached body 38 and the second attached body 43 to be moved to an opposite side to the front end sides of the first attached body 38 and the second attached body 43 with respect to the display device 4, and thus it is possible to more effectively prevent the adaptor 3 from falling off the display device 4.

In addition, since the pressing protrusions 41c, 41c, . . . are provided in plurality separately from each other in directions which connect the rotatable movement directions of the first attached body 38 and the second attached body 43 to the front ends thereof, a contact area with the display device 4 considerably increases, and thus it is possible to further more effectively prevent the adaptor 3 from falling off the display device 4.

Usage and the Like of Imaging Unit

As described above, the adaptor 3 attached to the imaging device 2 or 2A is attached to the display device 4, that is, the imaging device 2 or 2A is attached to the display device 4 via the adaptor 3, thereby forming the imaging unit 1.

In a state in which the adaptor 3 is attached to the display device 4, the first attached body 38 and the second attached body 43 are rotatably moved to the holding positions. In this state, for example, the first attached body 38 or the second attached body 43 and the display device 4 are placed on a placing surface 50 of a desk or the like, and thus the imaging unit 1 can be used in a stationary state (refer to FIG. 37).

As mentioned above, the first attached body 38 and the second attached body 43 has a function of attaching the adaptor 3 to the display device 4, and also has a function of a stand for using the imaging unit 1 in a stationary state. Therefore, it is possible to improve the convenience for a user through the improvement of the functionality.

In addition, a capturing operation of an image data or a video data is the same in both of a portable state and a stationary state of the imaging unit 1, and an image data or a video data acquired by the imaging device 2 or 2A is displayed on the display panel 6 of the display device 4 through wireless communication between the imaging device 2 or 2A and the display device 4. A photographer may capture the image data or the video data acquired by the imaging device 2 or 2A by checking a screen displayed on the display panel 6, and by operating the shutter button 2h of the imaging device 2 or 2A or operating a predetermined operation part of the display panel 6 which is a touch panel.

Examples in which the Number of Biasing Springs is Different

Although, in the above description, the adaptor 3 in which two biasing springs including the first biasing spring 30 and the second biasing spring 37 are provided has been described as an example, the adaptor may include, for example, three or more biasing springs.

Figure 38:
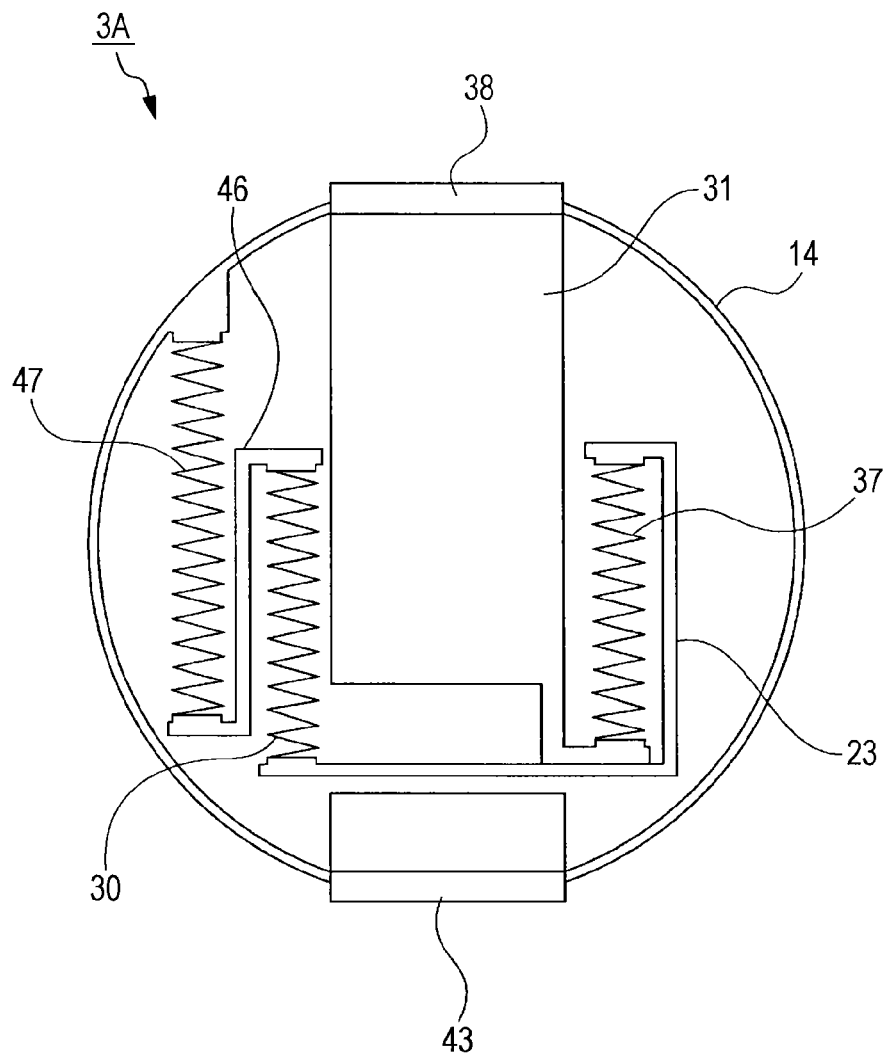
FIG. 38 is a conceptual diagram illustrating an example of an adaptor in which three biasing springs are used.

Hereinafter, a description will be made of an adaptor 3A including three biasing springs (refer to FIG. 38). In addition, the adaptor 3A described below is an example in which an adaptor according to an embodiment of the present technology can be formed using three or more biasing springs, and a configuration or the like thereof will be conceptually described below.

The adaptor 3A includes a first slider 23, a second slider 31, and a third slider 46 which all can be slid in the vertical direction. A second biasing spring 37 is supported between the first slider 23 and the second slider 31; a first biasing spring 30 is supported between the first slider 23 and the third slider 46; and a third biasing spring 47 is supported between the third slider 46 and the cover body 16.

Therefore, in the adaptor 3A, the second biasing spring 37, the first biasing spring 30, and the third biasing spring 47 are connected in series to each other via the first slider 23 and the third slider 46.

A spring force of the first biasing spring 30 is smaller than a spring force of the second biasing spring 37, and a spring force of the third biasing spring 47 is smaller than the spring force of the first biasing spring 30.

Figure 39:
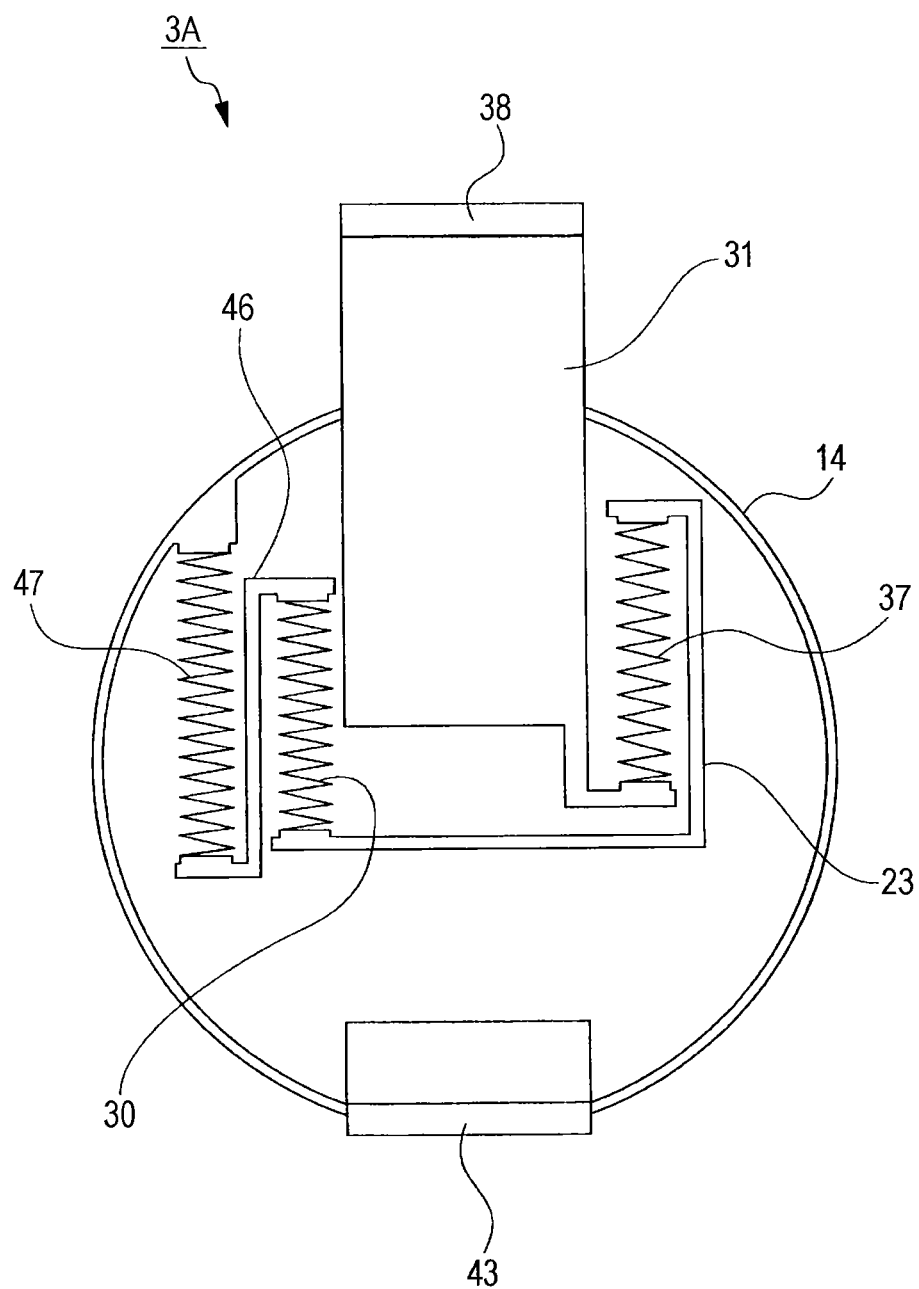
FIG. 39 is a conceptual diagram illustrating an operation in the example of the adaptor in which three biasing springs are used.

In the adaptor 3A, if the second slider 31 is moved due to a movement of the first attached body 38, the second biasing spring 37 is compressed so that the spring force of the second biasing spring 37 is applied to the first slider 23, and thus the first slider 23 is moved in the same direction as the second slider 31 (refer to FIG. 39). In addition, if the first slider 23 is moved, the first biasing spring 30 is compressed so that the spring force of the first biasing spring 30 is applied to the third slider 46, and thus the third slider 46 is moved in the same direction as the first slider 23. Further, if the third slider 46 is moved, the third biasing spring 47 is compressed.

As mentioned above, in the adaptor 3A, the second biasing spring 37, the first biasing spring 30, and the third biasing spring 47 are connected in series to each other via the first slider 23 and the third slider 46, and the second biasing spring 37, the first biasing spring 30, and the third biasing spring 47 are simultaneously compressed due to the sliding operation of the first slider 23. Therefore, a variation in a biasing force to the first attached body 38 is small when a gap between the first attached body 38 and the second attached body 43 varies.

In addition, in the adaptor according to the embodiment of the present technology, four or more biasing springs may be connected in series to each other via sliders.

One Embodiment of Imaging Unit

Figure 45:
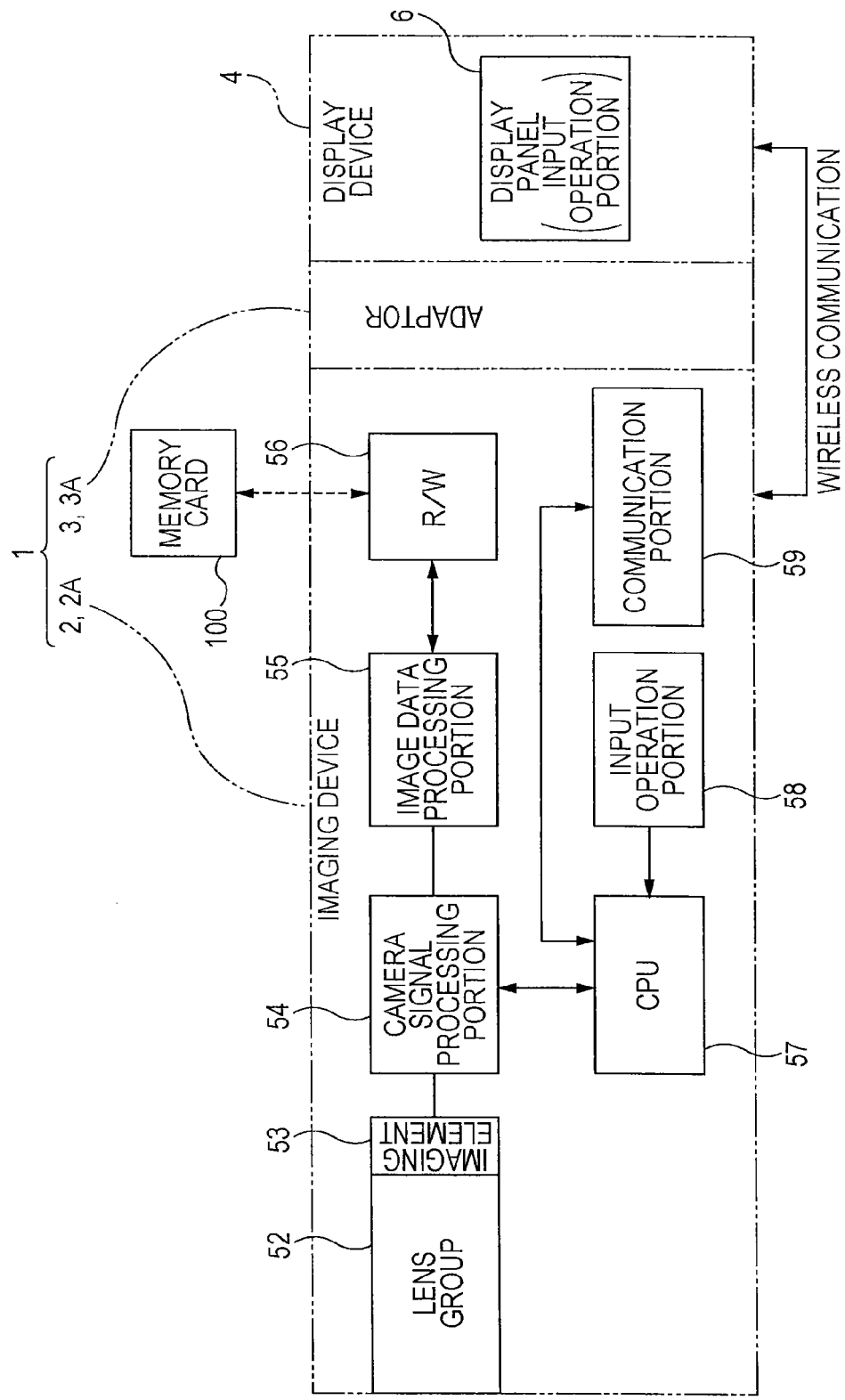
FIG. 45 is a block diagram of the imaging unit.

Hereinafter, a description will be made of a block diagram of an imaging unit according to an embodiment of the present technology (refer to FIG. 45).

The imaging unit 1 includes the imaging device 2 (2A) and the adaptor 3 (3A).

The imaging device 2 (2A) includes lens groups 52 which are arranged in an optical axis direction; an imaging element 53 which performs light incorporated via the lens groups 52 on photoelectric conversion; a camera signal processing portion 54 which performs a signal process such as analog-digital conversion of an image data captured by the imaging element 53; and an image data processing portion 55 which performs recording and reproducing processes of the image data. In addition, the imaging device includes a reader/writer (R/W) 56 which reads and writes an image data from and to a memory card 100; a central processing unit (CPU) 57 which controls the entire imaging device 2 (2A); an input operation portions 58, (the zoom switch 2g, the shutter button 2h, and the like) such as various switches which allow a user to perform a necessary operation; and an NFC part 59.

The camera signal processing portion 54 performs various signal processes such as conversion into a digital signal, noise removal, image quality correction, and conversion into a luminance/color difference signal, on an output signal from the imaging element 53.

The image data processing portion 55 performs a compression encoding process or a decompression decoding process of an image data based on a predetermined image data format, or a conversion process of a data standard such as a resolution.

The R/W 56 writes an image data encoded by the image data processing portion 55 to the memory card 100 and reads an image data recorded in the memory card 100.

The CPU 57 functions as a control process portion which controls the respective portions provided in the imaging device 2 (2A), and controls the respective portions on the basis of an instruction input signal from the input operation portions 58, . . . .

In addition, the CPU 57 can transmit and receive a variety of data and control information to and from the display device 4 side through wireless communication performed by the communication part 59 having the above-described NFC part or WIFI communication part.

The input operation portions 58, 58, . . . output an instruction input signal corresponding to an operation performed by a user, to the CPU 57.

The memory card 100 is, for example, a semiconductor memory which is attachable to and detachable from a memory card slot connected to the R/W 56.

Hereinafter, an operation of the imaging device 2 (2A) will be described.

If a shutter (not illustrated) is operated in response to an instruction input signal from the input operation portions 58, 58, . . . , a captured image data is output to the image data processing portion 55 from the camera signal processing portion 54 so as to undergo a compression encoding process, and is converted into digital data with a predetermined data format. The converted data is output to the R/W 56 so as to be written to the memory card 100. In addition, the converted data may be transmitted to the display device 4 through wireless communication so as to be output to the display panel 6, or so as to be written to a recording portion of the display device 4.

In a case where of reproducing the image data recorded in the memory card 100, the predetermined image data is read by the R/W 56 from the memory card 100 in response to an operation on the input operation portions 58, 58, . . . , so as to undergo a decompression decoding process in the image data processing portion 55, and then a reproduced image data is transmitted to the display device 4 through the wireless communication so as to be output to the display panel 6, thereby displaying a reproduced image.

Battery Mounting Structure

A description will be made of a battery mounting structure in the above-described imaging device 2 with reference to FIGS. 40 to 44.

Figure 40:
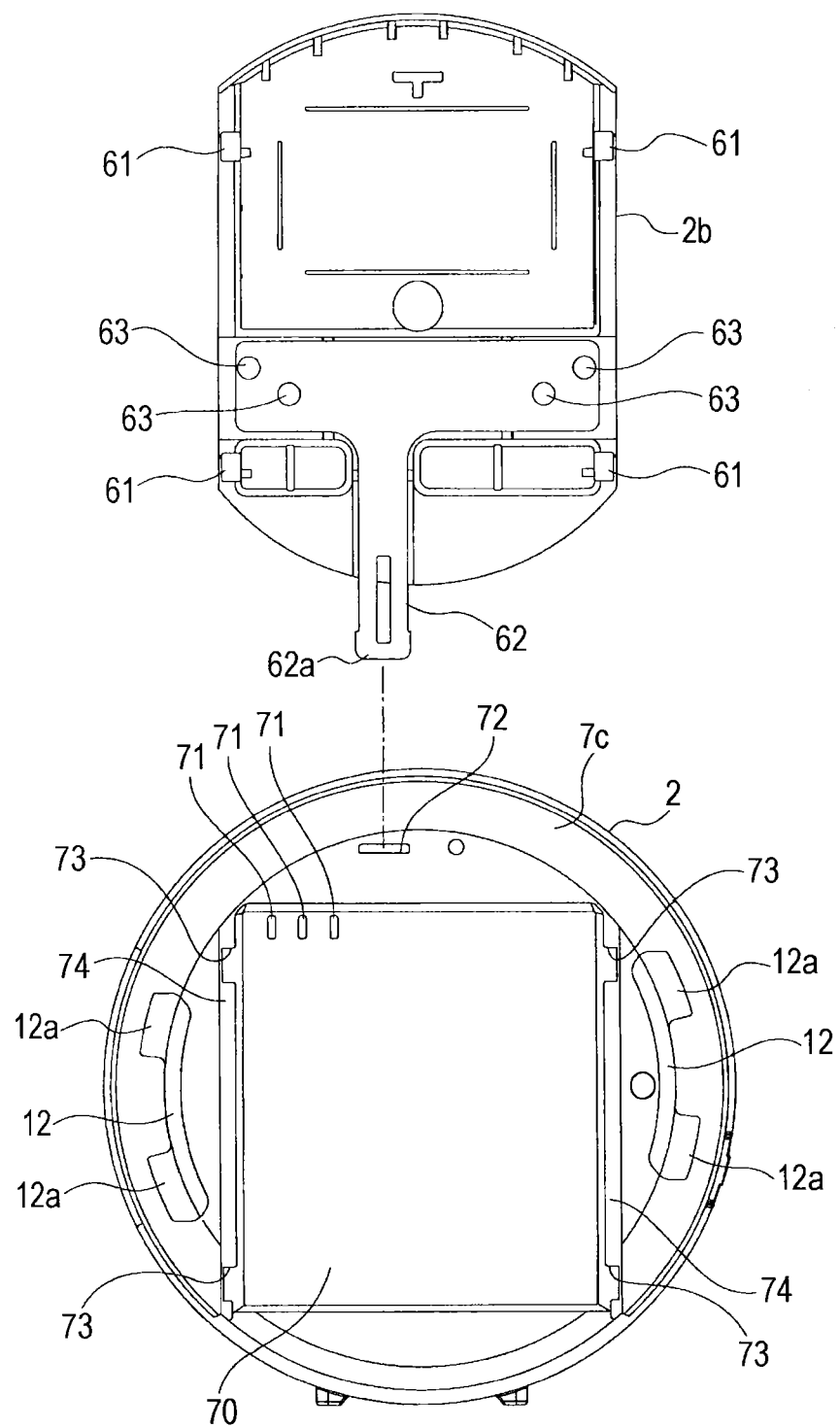
FIG. 40 is a plan view illustrating a rear surface a battery lid and a battery mounting part.

FIG. 40 illustrates a rear surface of the battery lid 2b and a battery mounting part 70 which is exposed to the rear surface part 7c side of the outer barrel 7 by opening the battery lid 2b.

Four slide claws 61 are provided on the rear surface of the battery lid 2b. In addition, a flexible connection member 62 which is positioned in a state of being inserted into bosses 63, 63, . . . is attached to the rear surface of the battery lid 2b. The flexible connection member 62 is fixed to the rear surface of the battery lid 2b through caulking to the bosses 63 or adhesion to rear surface of the battery lid 2b. A front end 62a of the flexible connection member 62 extends so as to protrude from the plane of the battery lid 2b, and the front end 62a is inserted into an insertion hole 72 provided at the upper side of the battery mounting part 70.

Figure 41:
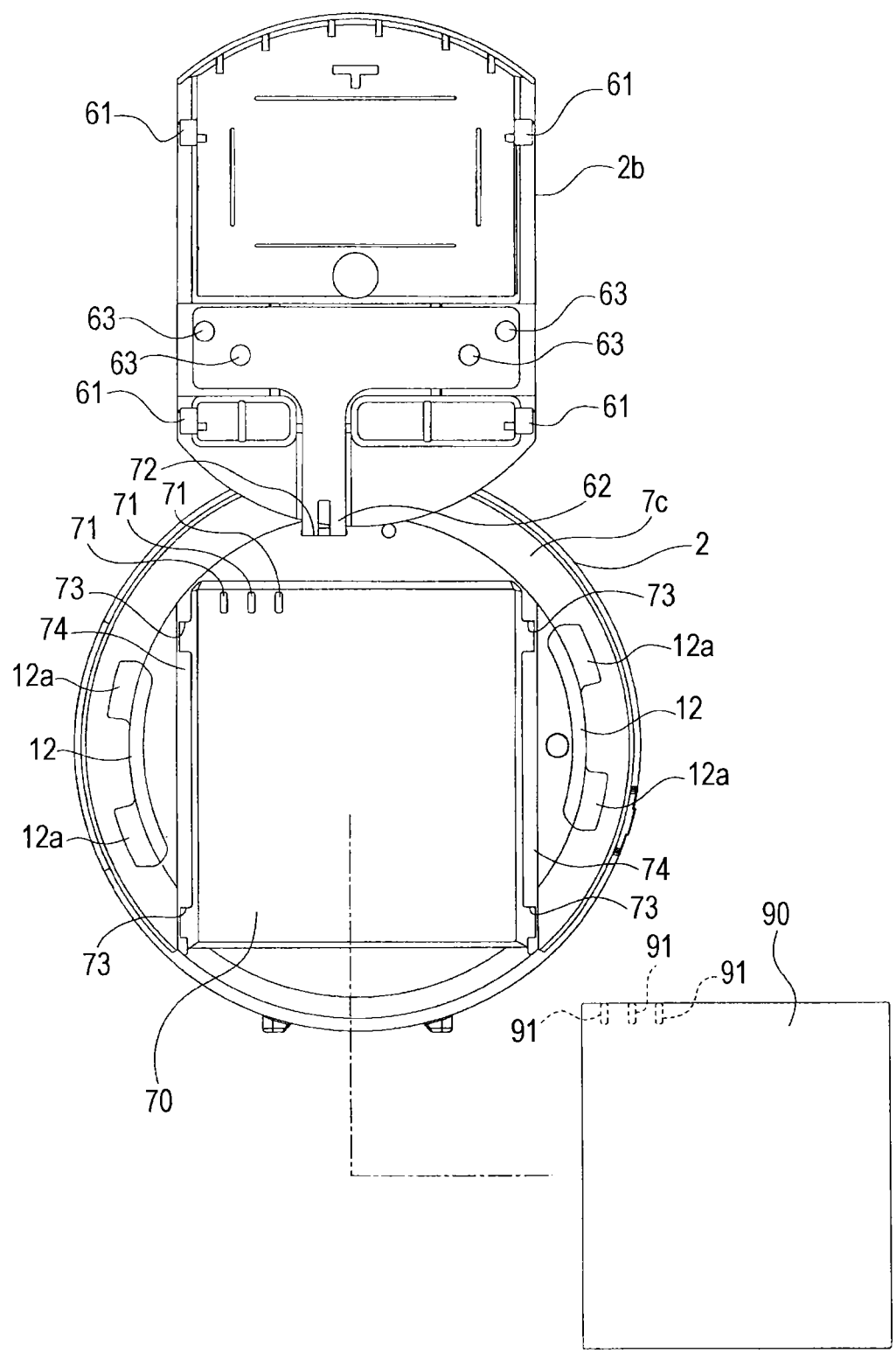
FIG. 41 is a plan view illustrating a state in which a battery is uninstalled when the battery lid is opened.

FIG. 40 illustrates, for description, a state in which the battery lid 2b is removed from the outer barrel 7, but, normally, in a case where the battery lid 2b is dislocated, the front end 62a of the flexible connection member 62 is locked in a state of being inserted into the insertion hole 72 as in FIG. 41. In other words, the flexible connection member 62 forms a hinge mechanism between the outer barrel 7 and the battery lid 2b. Accordingly, even in a state in which the battery lid 2b is opened, the battery lid 2b does not fall from the outer barrel 7. In addition, since the front end 62a has a length to an extent, the battery lid 2b can be moved freely to an extent with respect to the outer barrel 7.

Figure 42:
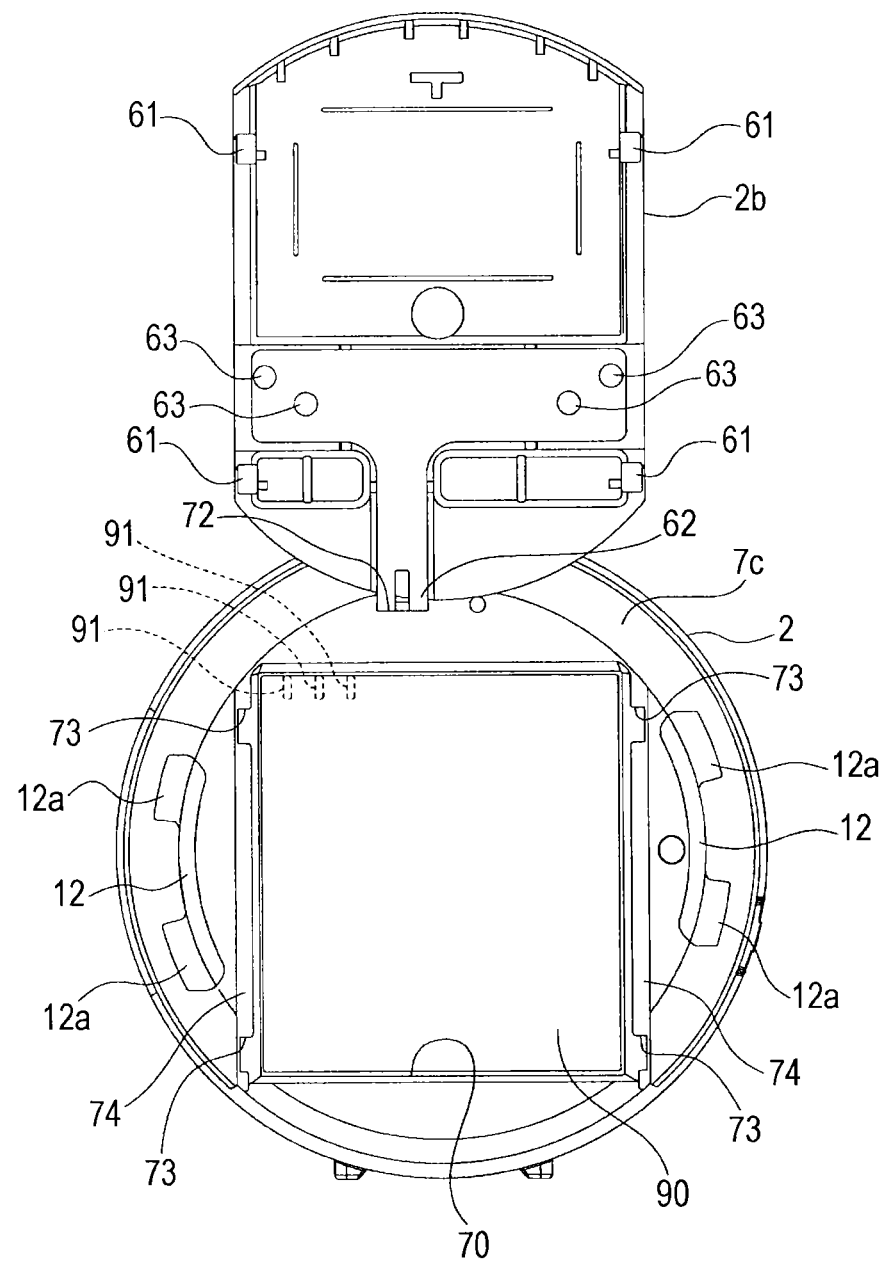
FIG. 42 a plan view illustrating a state in which the battery is installed when the battery lid is opened.

The battery mounting part 70 is a recessed space in which a flat square battery 90 illustrated in FIG. 41 can be installed. Electrode terminals 71, 71 and 71 which are in contact with electrode terminals 91, 91 and 91 of the battery 90 are formed at the upper side of the battery mounting part 70. FIG. 42 illustrates a state in which the battery 90 is mounted in the battery mounting part 70, and the electrode terminals 91, 91 and 91 are in contact with the electrode terminals 71, 71 and 71 in this state.

Locking rails 74 and 74 for attaching the battery lid 2b are formed on the right and left on the rear side of the space as the battery mounting part 70, and two notch parts 73 and 73 are formed in each of the two locking rails 74 and 74.

A total of four notch parts 73 are formed at positions corresponding to the four slide claws 61 of the rear surface of the battery lid 2b.

Figure 43:
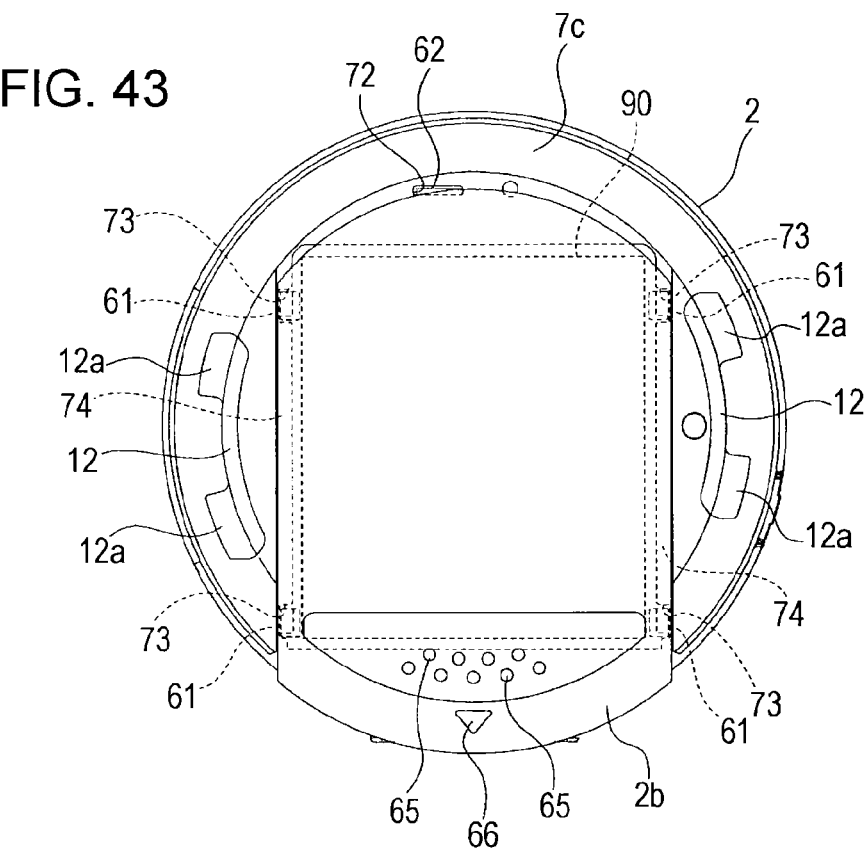
FIG. 43 is a plan view illustrating a procedure in which the battery lid is installed.

If the battery lid 2b is to be closed, the rear surface of the battery lid 2b is put on the rear surface part 7c side of the outer barrel 7, and the four slide claws 61 are respectively fitted into the four notch parts 73 as illustrated in FIG. 43. In addition, in this state, the battery lid 2b is slid, which leads to a state of FIG. 44. Accordingly the slide claws 61 are locked in the locking rails 74 and 74, and thus the battery lid 2b is in a closed state.

Figure 44:
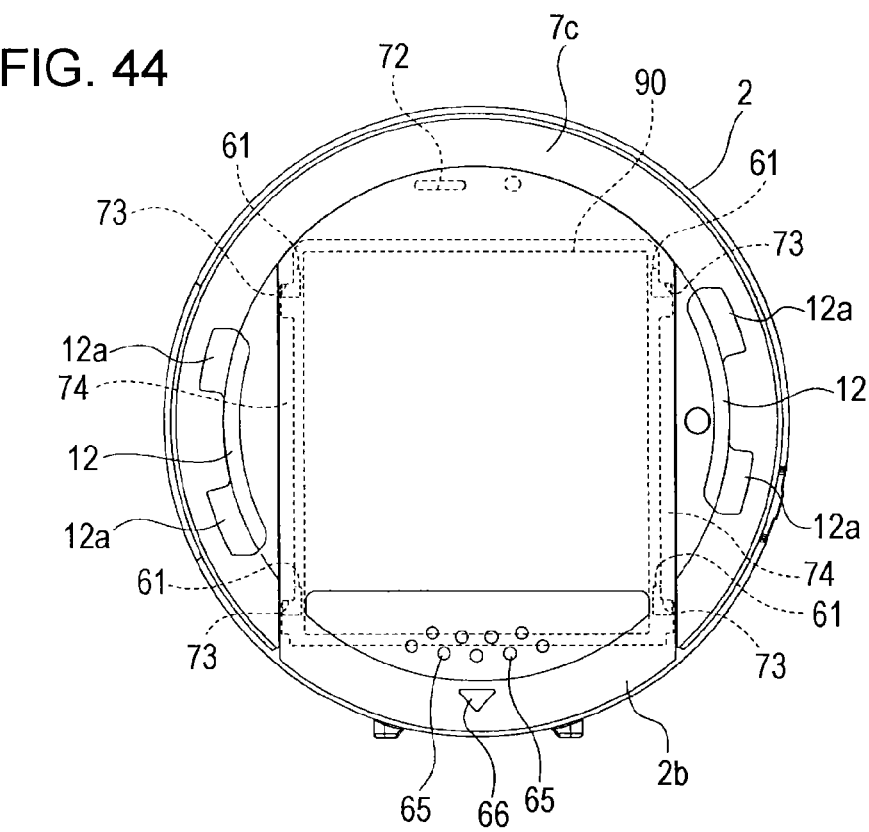
FIG. 44 is a plan view illustrating a state in which the battery lid is installed.

In a case of opening the battery lid 2b, the battery lid 2b is slid downward conversely. In addition, for this operation, as illustrated in FIG. 44, minute protrusions 65 for holding the finger or a mark 66 indicating a slide direction is preferably formed on the front surface side of the battery lid 2b.

If a user slides the battery lid 2b downward, the four slide claws 61 are respectively moved to the positions of the four notch parts 73 as illustrated in FIG. 43. When the battery lid 2b is raised in this state, the lid is opened as illustrated in FIG. 41.

As described above, the battery 90 is mounted in the battery mounting part 70 formed in the rear surface part 7c side of the outer barrel 7. In this case, the flat battery 90 is mounted in a posture in which the plane thereof is perpendicular to the imaging optical axis of the imaging device 2. In a case where the battery 90 is mounted in parallel to the imaging optical axis, a shaped part for storing a remaining battery is necessarily formed in a substantially cylindrical shape of the outer barrel 7, but if the battery 90 is stored in a vertical posture along the rear surface part 7c, this does not influence the shape of the outer barrel. Accordingly, a degree of freedom of design of the imaging device 2 increases.

In addition, as described above, the battery mounting part 70 is provided at the rear surface part 7c, which is thus suitable for miniaturization of the entire imaging device 2 in relation to a substrate (not illustrated) inside the outer barrel 7. For example, the substrate on which the imaging element is disposed is arranged so as to be perpendicular to the optical axis, but the battery storage space is formed in parallel to the substrate, which is thus suitable for reducing a casing size in the optical axis direction.

The battery 90 is attachable and detachable, and thus can be changed to a preliminary battery, thereby providing convenience in use.

In addition, in a case where opening the battery lid 2b, since the battery lid 2b has only to be slid downward and raised, the operation is simple, and a degree of freedom of a position is high in a state in which the battery lid does not fall by the flexible connection member 62. For this reason, the battery lid 2b is not impeded, and the battery lid 2b is prevented from being lost, in a case of exchange batteries, and the like.

Since the upper side of the battery lid 2b is connected to the outer barrel 7 by the flexible connection member 62, the battery lid 2b is easily located so as to naturally cover the battery mounting part 70. For this reason, it becomes easier for a user to put the slide claws 61 at the positions of the notch parts 73, and the battery lid 2b can be closed through a very simple operation in which the battery lid is slid upward as it is.

The battery lid 2b is provided, and thus the rear surface part 7c looks good. In addition, it is possible to prevent a battery from falling off.

In addition, the sliding during opening and closing of the battery lid 2b is performed along the locking rails 74 and 74, but this is performed in a state of avoiding the coupling parts 12 and 12. Therefore, a function of the coupling parts 12 and 12 is not impeded. Of course, the coupling parts 12 and 12 have a fixed structure which is not slid, and, in relation to this fact, a function of the coupling parts 12 and 12 is maintained regardless of sliding of the battery lid 2b.

In addition, the battery lid 2b has a structure of being slid downward, and thus the shape of the battery lid is not exposed to the upper side of the outer barrel 7. For example, as illustrated in FIG. 8, the battery lid 2b is exposed to the lower side, and the boundary with the battery lid 2b is viewed on the circumferential surface of the outer barrel 7. If this boundary is viewed on the upper side, this impairs the appearance. In other words, by using the downward sliding structure, the appearance of the upper side can be improved, and thus the appearance looks good.

Others

Although, in the above description, a description has been made of an example in which all of the first biasing spring 30, the second biasing spring 37, and the third biasing spring 47 are compression coil springs, these biasing springs may be different kinds of springs, and may be, for example, tensile coil springs.

In addition, although, in the above description, a description has been made of an example in which the first attached body 38 is moved in the vertical direction in a state of being biased in a direction of being close to the second attached body 43, for example, the first attached body 38 and the second attached body 43 may be respectively moved in the vertical direction in a state of being biased in a direction in which both two bodies are close to each other. In this case, a sliding mechanism which allows the second attached body 43 to be moved in the vertical direction may be provided, and biasing forces of a plurality of springs which are connected in series to each other may be applied to the second attached body 43.

Figure 46:
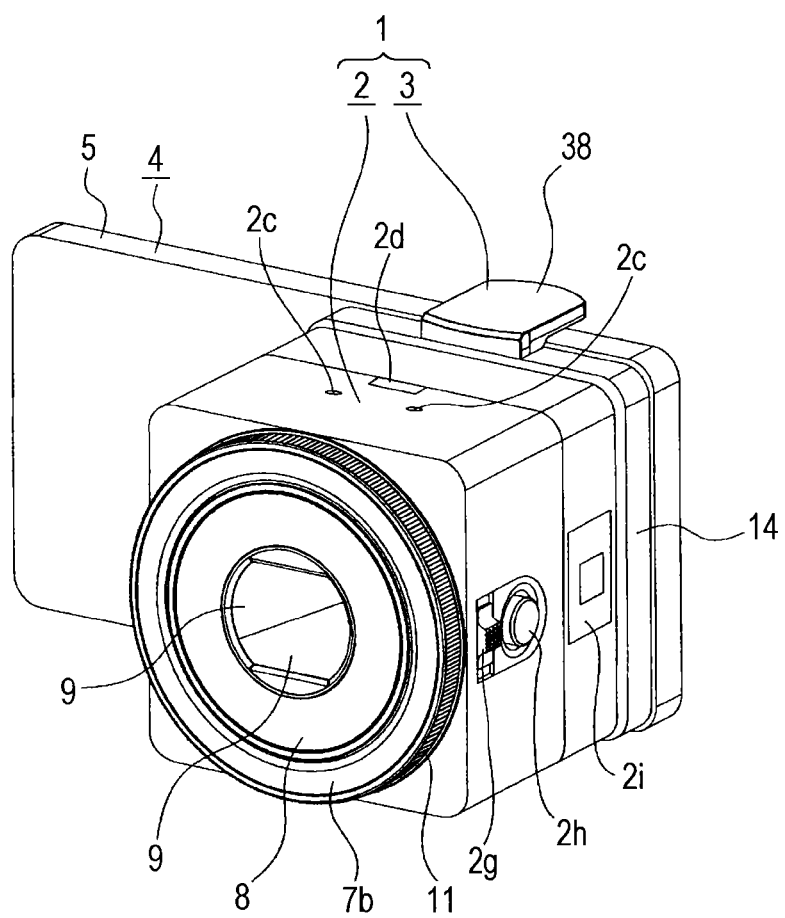
FIG. 46 is a perspective view illustrating another shape example of the imaging unit.

The imaging device 2 has been described as having a substantially cylindrical shape, but a shape of the imaging device 2 is not limited. For example, as illustrated in FIG. 46, an outer barrel shape of the imaging device 2 may be a substantially rectangular parallelopiped shape.

Conclusion

In the above-described embodiment, the imaging unit 1 includes the imaging device 2 and the adaptor 3.

Since the imaging unit is formed by the imaging device and the installation portion, the imaging device can be attached to an external display device so as to be used.

The imaging device 2 includes the communication part 59 which transmits an image data to an external device, the outer barrel 7 in which at least lens is disposed, the imaging element 53, the image taking button (shutter button 2*h*), and the power button 2*d*. In addition, the zoom switch 2*g* is included. Further, the rolling prevention part (rolling prevention protrusions 2*f* and 2*f*) which prevents the device casing from rolling in a placed state.

In addition, the circumferential surface part 7*a* is provided at the outer barrel 7; the shutter button 2*h* is disposed, for example, on the right side of the circumferential surface part 7*a*; the power button 2*d* is disposed at the upper side of the circumferential surface part 7*a*; and the zoom switch 2*g* is disposed at the circumferential surface part 7*a*.

As described above, the imaging device 2 is suitable as a device which performs an imaging operation and/or a display operation in cooperation with an external display device. Particularly, since the imaging element 53, the shutter button 2*h*, the power button 2*d*, and the zoom switch 2*g* are provided at the circumferential surface part 7*a*, the rear surface side can be attached to a display device, and thus it becomes easier to implement the imaging device 2 with a shape suitable for the cooperation with the display device.

In addition, the imaging device 2 is not provided with a display part which is used to display a captured image data obtained by the imaging element 53. Accordingly, it becomes easier to realize miniaturization of an imaging device which is cooperated with an external display device, and it becomes easier to implement an imaging device with a shape suitable for attachment to an external display device.

The circumferential surface part 7*a* is formed by a plurality of members. In other words, the circumferential surface part 7*a* is not only formed by an integrated component as the outer barrel 7, but is also formed by a combination with other components, for example, a member 2*k* or the like. Accordingly, the circumferential surface part can be provided in a state in which a plurality of functional parts are provided. However, the circumferential surface part 7*a* may be formed only by an integrated component as the outer barrel 7.

In a case where the whole or a part of the circumferential surface part 7*a* is curved, the rolling prevention protrusions 2*f* and 2*f* are useful.

The adaptor 3 which is attached to the imaging device 2 transmitting an image data to the external display device 4, and allows the imaging device 2 to be attachable to and detachable from the display device 4, includes sliders (23 and 31) which are slidable with respect to the outer barrel 7 of the imaging device 2; the first attached body 38 connected to the sliders (23 and 31); the second attached body 43 which can change its gap with the first attached body 38; and biasing members (first and second biasing springs 30 and 37) which bias the first attached body 38 and the second attached body 43 in a direction in which a gap therebetween becomes narrowed. The display device 4 is grasped by the first attached body 38 and the second attached body 43.

If the adaptor 3 is attached to the imaging device 2, the imaging device 2 can be attached to the external display device 4 so as to be used.

When the imaging unit is viewed as a whole, the first attached body 38 and the second attached body 43 are disposed at the rear surface side thereof, and thus a structure of being attached to a display device on the rear surface side of the imaging unit is realized.

The imaging device 2 includes the first and second coupling parts 12 and 12 which can be coupled to the adaptor 3 which is an installation device; the first and second coupling parts 12 and 12 are disposed at the rear surface part 7*c* of the outer barrel 7; and the storage part (the battery mounting part 70) which stores a battery is provided between the first coupling part 12 and the second coupling part 12 in the rear surface part 7*c* of the outer barrel 7.

Therefore, the battery mounting part 70 is provided by effectively using the rear surface part in which the first and second coupling parts 12 and 12 are provided, that is, the space of the installation surface side with the adaptor 3. Particularly, since the battery mounting part 70 is provided between the first and second coupling parts 12 and 12, the battery mounting part 70 can be provided in a state in which installation of the adaptor 3 is not impeded.

The imaging device 2 and the adaptor 3 are coupled to each other by relatively rotating the imaging device 2 main body and the adaptor 3 via the first and second coupling parts 12 and 12. Accordingly, the imaging device and the installation device can be easily coupled to each other.

As described above, in the imaging unit 1 (51) and the adaptor 3 or 3A, the first attached body 38 is connected to the second slider 31 in which the number of biasing springs interposed up to the base body 15 is the maximum; a gap between the first attached body 38 and the second attached body 43 varies so as to be attached to the display devices 4 having different sizes; and spring forces of the biasing springs are reduced in an order from the first attached body 38 side to the base body 15 side.

Therefore, when a gap between the first attached body 38 and the second attached body 43 varies, a spring force hardly varies regardless of an extension amount of the biasing spring, and a variation in a biasing force in a direction of the first attached body 38 being close to the second attached body 43 is small. Thus, it is possible to ensure a state in which the adaptor 3 is stably attached to the display device 4 regardless of a size of the display device 4.

In addition, since a plurality of biasing springs are connected in series to each other, a large extension amount of the biasing spring can be secured in proportion thereto, and a sufficient gap between the first attached body 38 and the second attached body 43 can be secured so as to correspond to the display devices 4 having different sizes.

Further, in the adaptor 3, the first slider 23 and the second slider 31 are provided as a plurality of sliders; the first biasing spring 30 and the second biasing spring 37 are provided as a plurality of biasing springs; and a spring force of the first biasing spring 30 is smaller than a spring force of the second biasing spring 37.

Therefore, with the minimally necessary configuration, it is possible to reduce a difference between spring forces based on a gap between the first attached body 38 and the second attached body 43, and it is possible to reduce the number of components and simplify mechanisms. Thus, it is possible to ensure a state in which the adaptor 3 is stably attached to the display device 4 regardless of a size of the display device 4.

Furthermore, since the plurality of biasing springs are arranged in a direction perpendicular to a sliding direction of the slider, it is possible to miniaturize the adaptor 3 and 3A in the sliding direction.

Present Technology

The effects described in the present specification are only an example, and are not limited, and other effects may be achieved.

The present technology may have the following configurations.

(1) An imaging device including a communication part that transmits an image data to an external display device; an outer barrel; an imaging element; and first and second coupling parts that are configured to be coupled to an installation device which is attachable to and detachable from the display device, in which the first and second coupling parts are disposed at a rear surface part of the outer barrel, and in which a storage part that stores a battery is provided between the first coupling part and the second coupling part in the rear surface part of the outer barrel.

(2) The imaging device according to the above (1), in which the storage part allows a battery to be stored from a direction which is substantially perpendicular to an imaging optical axis.

(3) The imaging device according to the above (1) or (2), in which the storage part is provided with a battery lid that closes the storage part storing a battery.

(4) The imaging device according to any one of the above (1) to (3), in which the storage part is provided with a battery lid that closes the storage part storing a battery, and in which the battery lid is slid downward.

(5) The imaging device according to the above (4), in which the first and second coupling parts are set to fixed positions so as not to be slid in the rear surface part.

(6) The imaging device according to any one of the above (1) to (3), in which the storage part is provided with a battery lid that closes the storage part storing a battery, and in which the battery lid is slid to avoid the first and second coupling parts.

(7) The imaging device according to the above (6), in which the first and second coupling parts are set to fixed positions so as not to be slid in the rear surface part.

(8) The imaging device according to any one of the above (1) to (7), in which the storage part is provided with a battery lid that closes the storage part storing a battery, in which the battery lid includes a connection member to the rear surface part of the outer barrel, in which the connection member connects an upper side of the battery lid to the rear surface part, and in which the battery lid can be opened upward with the connection member as a fulcrum.

(9) The imaging device according to any one of the above (1) to (8), in which the storage part has a connection terminal to a battery, which is provided at an upper side in a battery storage space.

(10) The imaging device according to any one of the above (1) to (9), in which the storage part is formed so that a battery is horizontally symmetrically stored.

(11) The imaging device according to any one of the above (1) to (10), in which the first and second coupling parts protrude backward from the rear surface part of the outer barrel.

(12) The imaging device according to any one of the above (1) to (11), in which the first and second coupling parts are disposed at an outer circumference of the rear surface part of the outer barrel.

(13) The imaging device according to any one of the above (1) to (12), in which the first and second coupling parts include locking protrusions that protrude outward separately from each other in a circumferential direction.

(14) The imaging device according to any one of the above (1) to (13), in which a lock pin that maintains a coupling state is formed around the first and second coupling parts.

(15) The imaging device according to any one of the above (1) to (14), in which an imaging device main body and the installation device are relatively rotated via the first and second coupling parts so as to couple the imaging device main body and the installation device to each other.

(16) The imaging device according to any one of the above (1) to (15), further including an image taking button; a power button; and a zoom switch, in which a circumferential surface part is provided at the outer barrel, in which the image taking button is disposed at a left side of the circumferential surface part, in which the power button is disposed at an upper side of the circumferential surface part, and in which the zoom switch is disposed at the circumferential surface part.

(17) The imaging device according to any one of the above (1) to (15), further including an image taking button; a power button; a zoom switch; and a rolling prevention part that prevents a device casing from rolling in a placed state, in which a circumferential surface part which at least partially has a curved surface is provided at the outer barrel, in which the image taking button is disposed at the circumferential surface part, in which the power button is disposed at the circumferential surface part, in which the zoom switch is disposed at the circumferential surface part, and in which the rolling prevention part is disposed at a lower side of the circumferential surface part.

(18) The imaging device according to any one of the above (1) to (15), further including an image taking button; and a power button, in which a circumferential surface part is provided at the outer barrel, and in which the image taking button and the power button are disposed at different positions in a circumferential direction on the circumferential surface part.

(19) The imaging device according to any one of the above (1) to (18), further including a power button, in which the power button is disposed so as not to further protrude than a surface forming the circumferential surface part of the outer barrel.

(20) The imaging device according to any one of the above (1) to (19), in which a microphone that inputs an external sound is disposed at the circumferential surface part of the outer barrel.

(21) The imaging device according to any one of the above (1) to (20), in which a tripod hole is disposed at a lower end of a circumferential surface part of the outer barrel.

(22) The imaging device according to any one of the above (1) to (21), in which a near field communication part is disposed at positions other than a rear surface side of the outer barrel.

(23) The imaging device according to any one of the above (1) to (22), in which a near field communication part is disposed at an upper side of a circumferential surface part of the outer barrel.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging device comprising:
   a communication part that transmits an image data to an external display device;
   an outer barrel;
   an imaging element; and
   first and second coupling parts that are configured to be coupled to an installation device which is attachable to and detachable from the display device,
   wherein the first and second coupling parts are disposed at a rear surface part of the outer barrel, and
   wherein a storage part that stores a battery is provided between the first coupling part and the second coupling part in the rear surface part of the outer barrel.

2. The imaging device according to claim 1,
   wherein the storage part allows a battery to be stored from a direction which is substantially perpendicular to an imaging optical axis.

3. The imaging device according to claim 1,
   wherein the storage part is provided with a battery lid that closes the storage part storing a battery.

4. The imaging device according to claim 1,
   wherein the storage part is provided with a battery lid that closes the storage part storing a battery, and
   wherein the battery lid is slidable downward.

5. The imaging device according to claim 4,
   wherein the first and second coupling parts are set to fixed positions so as not to be slid in the rear surface part.

6. The imaging device according to claim 1,
   wherein the storage part is provided with a battery lid that closes the storage part storing a battery, and
   wherein the battery lid is slidable to avoid the first and second coupling parts.

7. The imaging device according to claim 6,
   wherein the first and second coupling parts are set to fixed positions so as not to be slid in the rear surface part.

8. The imaging device according to claim 1,
   wherein the storage part is provided with a battery lid that closes the storage part storing a battery,
   wherein the battery lid includes a connection member to the rear surface part of the outer barrel,
   wherein the connection member connects an upper side of the battery lid to the rear surface part, and
   wherein the battery lid can be opened upward with the connection member as a fulcrum.

9. The imaging device according to claim 1,
   wherein the storage part has a connection terminal to a battery, the connection terminal being provided at an upper side in a battery storage space.

10. The imaging device according to claim 1,
    wherein the storage part is formed so that a battery is horizontally symmetrically stored.

11. The imaging device according to claim 1,
    wherein the first and second coupling parts protrude backward from the rear surface part of the outer barrel.

12. The imaging device according to claim 1,
    wherein the first and second coupling parts are disposed at an outer circumference of the rear surface part of the outer barrel.

13. The imaging device according to claim 1,
    wherein the first and second coupling parts include locking protrusions that protrude outward separately from each other in a circumferential direction.

14. The imaging device according to claim 1,
    wherein a lock pin that maintains a coupling state is formed around the first and second coupling parts.

15. The imaging device according to claim 1,
    wherein an imaging device main body and the installation device are relatively rotated via the first and second coupling parts so as to couple the imaging device main body and the installation device to each other.

16. The imaging device according to claim 1, further comprising:
    an image taking button;
    a power button;
    a zoom switch; and
    a rolling prevention part that prevents a device casing from rolling in a placed state,
    wherein a circumferential surface part which at least partially has a curved surface is provided at the outer barrel,
    wherein the image taking button is disposed at the circumferential surface part,
    wherein the power button is disposed at the circumferential surface part,
    wherein the zoom switch is disposed at the circumferential surface part, and
    wherein the rolling prevention part is disposed at a lower side of the circumferential surface part.

17. The imaging device according to claim 1, further comprising:
    an image taking button; and
    a power button,
    wherein a circumferential surface part is provided at the outer barrel, and
    wherein the image taking button and the power button are disposed at different positions in a circumferential direction on the circumferential surface part.

18. The imaging device according to claim 1, further comprising a power button,
    wherein the power button is disposed so as not to further protrude than a surface forming the circumferential surface part of the outer barrel.

19. The imaging device according to claim 1,
    wherein a microphone that inputs an external sound is disposed at the circumferential surface part of the outer barrel.

20. The imaging device according to claim 1,
    wherein a tripod hole is disposed at a lower end of a circumferential surface part of the outer barrel.

21. The imaging device according to claim 1,
    wherein a near field communication part is disposed at positions other than a rear surface side of the outer barrel.

22. The imaging device according to claim 1,
    wherein a near field communication part is disposed at an upper side of a circumferential surface part of the outer barrel.

23. The imaging device according to claim 1,
    wherein the installation device includes a first attachment member and a second attachment member, and the installation device grasps the display device using the first attachment member and the second attachment member.

* * * * *